(12) United States Patent
Aoki et al.

(10) Patent No.: US 9,605,172 B2
(45) Date of Patent: Mar. 28, 2017

(54) INK COMPOSITION, SET OF INK COMPOSITION AND INK CONTAINER, INK CONTAINER, AND RECORDING APPARATUS

(71) Applicant: Seiko Epson Corporation, Tokyo (JP)

(72) Inventors: Katsuko Aoki, Kiso (JP); Tomohito Nakano, Shiojiri (JP); Shoki Kasahara, Mobara (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/461,910

(22) Filed: Aug. 18, 2014

(65) Prior Publication Data

US 2015/0049144 A1 Feb. 19, 2015

(30) Foreign Application Priority Data

Aug. 19, 2013 (JP) .................................. 2013-169430
Aug. 19, 2013 (JP) .................................. 2013-169713

(Continued)

(51) Int. Cl.
*B41J 2/21* (2006.01)
*C09D 11/36* (2014.01)
(Continued)

(52) U.S. Cl.
CPC .............. *C09D 11/36* (2013.01); *B41J 2/175* (2013.01); *B41J 2/17506* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,488,395 A  1/1996 Takayanagi et al.
5,675,367 A  10/1997 Scheffelin et al.
(Continued)

FOREIGN PATENT DOCUMENTS

EP  0719646 A2  7/1996
EP  1300244 A1  4/2003
(Continued)

OTHER PUBLICATIONS

Extended European Search Report for Application No. EP 14 18 1323 dated Dec. 3, 2014 (7 pages).
(Continued)

*Primary Examiner* — Manish S Shah
(74) *Attorney, Agent, or Firm* — Harness, Dickey & Pierce, P.L.C.

(57) ABSTRACT

An ink composition adapted to be poured into an ink container including an ink chamber, the ink chamber partitioned by a wall, refillable with the ink composition via an ink poring port, and communicating with external air, the ink composition comprising a pigment, a resin and an organic solvent, wherein the ink composition has a static contact angle of 10° or more to a member constituting an inner side of the wall.

12 Claims, 13 Drawing Sheets

(30) Foreign Application Priority Data

| | | |
|---|---|---|
| Aug. 19, 2013 | (JP) | 2013-169714 |
| Mar. 28, 2014 | (JP) | 2014-068093 |
| Jun. 17, 2014 | (JP) | 2014-124191 |
| Jun. 17, 2014 | (JP) | 2014-124257 |

(51) Int. Cl.
*C08K 5/3415* (2006.01)
*C08K 5/053* (2006.01)
*B41J 2/175* (2006.01)
*C09D 11/322* (2014.01)
*C09D 11/324* (2014.01)
*C09D 11/10* (2014.01)
*C09D 11/38* (2014.01)
*C09D 11/40* (2014.01)

(52) U.S. Cl.
CPC ........... *B41J 2/17513* (2013.01); *C08K 5/053* (2013.01); *C08K 5/3415* (2013.01); *C09D 11/10* (2013.01); *C09D 11/322* (2013.01); *C09D 11/324* (2013.01); *C09D 11/38* (2013.01); *C09D 11/40* (2013.01)

(58) Field of Classification Search
CPC .... B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .. 347/95, 96, 100, 101, 102, 88, 99, 21, 20; 523/160, 161; 106/31.6, 31.13, 31.27
See application file for complete search history.

(56) References Cited

U.S. PATENT DOCUMENTS

| | | | |
|---|---|---|---|
| 5,801,737 | A | 9/1998 | Sato et al. |
| 6,168,267 | B1 | 1/2001 | Komplin |
| 6,179,415 | B1 | 1/2001 | Okazaki et al. |
| 6,332,675 | B1 | 12/2001 | Koitabashi et al. |
| 6,450,631 | B1 | 9/2002 | Hayashi et al. |
| 6,702,427 | B2 | 3/2004 | Shimizu et al. |
| 6,793,330 | B2 | 9/2004 | Usui et al. |
| 7,147,309 | B2 | 12/2006 | Sakai et al. |
| 7,575,312 | B2 | 8/2009 | Ota et al. |
| 2002/0163567 | A1 | 11/2002 | Hou et al. |
| 2004/0174417 | A1 | 9/2004 | Kobayashi et al. |
| 2005/0075449 | A1 | 4/2005 | Kubota |
| 2006/0181568 | A1 | 8/2006 | Aoki |
| 2007/0057990 | A1 | 3/2007 | Yakura et al. |
| 2007/0129462 | A1 | 6/2007 | Ma |
| 2009/0263632 | A1* | 10/2009 | Kojima et al. ................ 347/100 |
| 2010/0182385 | A1* | 7/2010 | Steinmetz ............ B41J 2/17503 347/86 |
| 2012/0052261 | A1 | 3/2012 | Aoyama et al. |
| 2012/0176455 | A1* | 7/2012 | Ohta et al. .................... 347/102 |
| 2012/0182364 | A1* | 7/2012 | Takeda ................ B41J 2/17506 347/85 |
| 2014/0043408 | A1 | 2/2014 | Kudo et al. |

FOREIGN PATENT DOCUMENTS

| | | |
|---|---|---|
| JP | 06-238908 | 8/1994 |
| JP | 2873520 B2 | 3/1999 |
| JP | 3122323 B2 | 1/2001 |
| JP | 2002-234184 A | 8/2002 |
| JP | 2004-230636 A | 8/2004 |
| JP | 2007-070513 A | 3/2007 |
| JP | 2008-208206 A | 9/2008 |
| JP | 2011-240706 A | 12/2011 |
| JP | 2012-051308 A | 3/2012 |
| JP | 2012-148511 A | 8/2012 |
| WO | WO-2007-020461 A2 | 2/2007 |

OTHER PUBLICATIONS

Partial European Search Report for Application No. EP 14 18 1321 dated Jan. 20, 2015 (8 pages).
Extended European Search Report for Application No. EP 14 18 1321 dated Feb. 12, 2015 (13 pages).
Extended European Search Report for Application No. EP 14 18 1321 dated Sep. 24, 2015 (18 pages).

* cited by examiner

INK COMPOSITION, SET OF INK COMPOSITION AND INK CONTAINER, INK CONTAINER, AND RECORDING APPARATUS

BACKGROUND

Technical Field

The present invention relates to an ink composition, an ink container, a set of an ink composition and an ink container, and a recording apparatus.

Related Art

In the related art, there has been known an ink jet recording apparatus which records images or the like on a recording medium with minute ink droplets discharged from nozzles of a recording head for ink jet recording. The ink jet recording apparatus includes an ink container (for example, an ink cartridge) for supplying an ink composition to the recording head.

As such an ink container, there has been known a refill (pouring) type ink container (a so-called continuous supply type ink container) in which a continuous supply type ink container is refilled with an ink composition instead of replacing the ink container, as well as a replaceable ink container (a so-called ink cartridge) in which the ink container itself is replaced, when an ink composition in the ink container is equal to or less than a predetermined amount. For example, in JP-A-2012-148511, there is disclosed an ink jet recording apparatus which supplies ink from a continuous supply type ink tank to an ink jet head through an ink supply tube, and the ink tank has an ink-refillable structure.

However, the continuous supply type ink container disclosed in JP-A-2012-148511 is a so-called atmosphere open type container in which an ink chamber is opened to the atmosphere.

Thus, an interface (gas-liquid interface) between the air present in the upper side of the ink chamber and the ink is generated in the ink chamber of the container. Since the ink composition used in such an ink container easily dries at the gas-liquid interface, aggregates derived from components included in the ink are easily generated at the gas-liquid interface. That is, when moisture or the like evaporates from a thin film generated at the gas-liquid interface, the solid content in the ink aggregates to form aggregates. Particularly, when the wettability of ink to a material constituting the inner wall of the ink chamber is high, the area of a thin film formed at the contact portion of the inner side of the wall and the liquid surface of the ink is increased and the thickness thereof is reduced, and thus, the degree of the generation of aggregates becomes higher. The recording head of the ink jet recording apparatus has a mechanism in which ink droplets are discharged from minute nozzles, and thus, when the aggregates reach the nozzles, the nozzles are clogged and the quality of a recorded image is deteriorated. Therefore, a filter for capturing foreign substances such as aggregates is usually provided in a flow path for supplying ink to the nozzles so that the foreign substances do not reach the nozzles. However, when a large amount of foreign substances is accumulated in the filter, the amount of ink supplied to the recording head is reduced and normal recording is interrupted.

Further, since the continuous supply type ink container which can be refilled with ink has a significantly large gas-liquid interface area and a significantly large number of contact portions between the inner side of the wall and the liquid surface of the ink, and has a very long period of use, compared to the cartridge type ink container, aggregates are easily generated in a large amount or frequently, and inconveniences such as ink supply failure due to the aggregates captured by the filter or the like become apparent easily.

SUMMARY

An advantage of some aspects of the invention is to provide an ink composition in which the generation of aggregates as described above can be suppressed in a continuous supply type ink container.

The invention can be realized in the following forms or application examples.

APPLICATION EXAMPLE 1

According to an aspect of the invention, there is provided an ink composition adapted to be poured into an ink container including an ink chamber, the ink chamber partitioned by a wall, refillable with the ink composition via an ink poring port, and communicating with external air. The ink composition includes a pigment, a resin, and an organic solvent. The ink composition has a static contact angle of 10° or more to a member constituting an inner side of the wall.

In the ink composition according to Application Example 1, since the generation of aggregates can be suppressed, a recording apparatus has excellent discharge stability.

APPLICATION EXAMPLE 2

The ink composition according to Application Example 1 may further include water. The ink composition may satisfy following conditions (1) and (2).

$10° \leq CA_0$, and $10° \leq CA_1$  Condition (1):

$0° \leq CA_0 - CA_1 \leq 5°$  Condition (2):

Where $CA_0$ is a static contact angle between the ink composition before moisture evaporation and the member constituting the inner side of the wall, and $CA_1$ is a static contact angle between the ink composition when 1% by mass of moisture with respect to a total mass (100% by mass) of the ink composition before moisture evaporation evaporates and the member constituting the inner side of the wall.

APPLICATION EXAMPLE 3

In the ink composition according to Application Example 1 or 2, may have a surface tension of 20 mN/m or more and 50 mN/m or less.

APPLICATION EXAMPLE 4

In the ink composition according to any one of Application Examples 1 to 3, the content of the organic solvent may be 5% by mass or more and 40% by mass or less.

APPLICATION EXAMPLE 5

In the ink composition according to any one of Application Examples 1 to 4, the organic solvent may include glycerin, and at least one selected from the group consisting of polyhydric alcohols excluding the glycerin, nitrogen-containing heterocyclic compounds, urea, and urea derivatives.

APPLICATION EXAMPLE 6

In the ink composition according to any one of Application Examples 1 to 5, the glass transition temperature of the resin may be 25° C. or lower.

APPLICATION EXAMPLE 7

In the ink composition according to any one of Application Examples 1 to 6, may have a receding contact angle of 5° or more to the member constituting the inner side of the wall.

APPLICATION EXAMPLE 8

In the ink composition according to any one of Application Examples 1 to 7, may satisfy two or more of the following conditions (3-1), (3-2), and (3-3) or may satisfy all the following conditions (4-1) to (4-3).

$\gamma_{M1}-\gamma_{M0}>0 (mN/m)$  Condition (3-1):

$\gamma_{M2}-\gamma_{M0}>0 (mN/m)$  Condition (3-2):

$\gamma_{M3}-\gamma_{M0}>0 (mN/m)$  Condition (3-3):

$\gamma_{M1}-\gamma_{M0}>-0.5 (mN/m)$  Condition (4-1):

$\gamma_{M2}-\gamma_{M0}>-0.5 (mN/m)$  Condition (4-2):

$\gamma_{M3}-\gamma_{M0}>-0.5 (mN/m)$  Condition (4-3):

Where $\gamma_{M0}$ is an initial surface tension of the ink composition, $\gamma_{M1}$ is a surface tension when 3.5% by mass of the solvent in the ink evaporates, $\gamma_{M2}$ is a surface tension when 7% by mass of the solvent in the ink evaporates, and $\gamma_3$ is a surface tension when 12% by mass of the solvent in the ink evaporates.

APPLICATION EXAMPLE 9

In the ink composition according to any one of Application Examples 1 to 8, the content of the organic solvent may be more than one time and 10 times or less of a total of the content of the pigment and the content of the resin.

APPLICATION EXAMPLE 10

According to another aspect of the invention, there is provided a set including: the ink composition according to any one of Application Examples 1 to 9; and the ink container.

APPLICATION EXAMPLE 11

According to still another aspect of the invention, there is provided an ink container adapted to connect with a recording apparatus. The ink container includes an ink chamber containing the ink composition according to any one of Application Examples 1 to 9, and an ink pouring port through which the ink composition is poured into the ink chamber.

APPLICATION EXAMPLE 12

According to still another aspect of the invention, there is provided a recording apparatus including: the ink container according to Application Example 11.

BRIEF DESCRIPTION OF THE DRAWINGS

Embodiments of the invention will now be described by way of example only with reference to the accompanying drawings, wherein like numbers reference like elements.

DESCRIPTION OF EXEMPLARY EMBODIMENTS

Figure 1A:
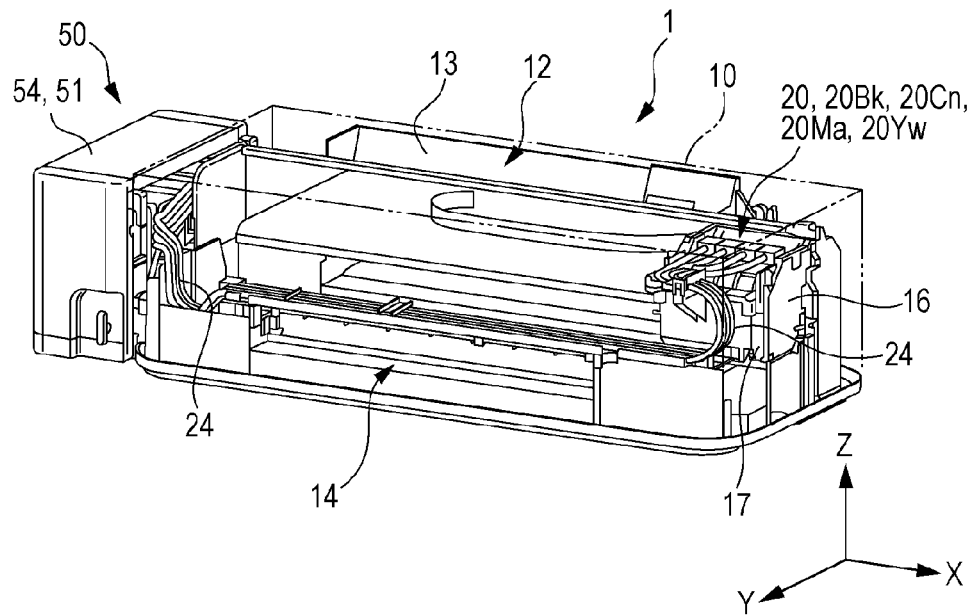
FIGS. 1A and 1B are perspective views schematically showing an ink jet recording apparatus according to an embodiment of the invention.

Preferred embodiments of the invention will be described below. The embodiments described below describe one example of the invention. In addition, the invention is not limited by the following embodiments, and includes various modifications carried out in a range not departing from the scope of the invention as defined by the claims.

1. Ink Composition 1.1. Component

An ink composition according to an embodiment is poured into an ink container to be used. The ink container includes an ink chamber which is connected to a recording apparatus and can be refilled with the ink composition according to the embodiment, and an ink pouring port which is openable and closable, and the ink chamber is capable of communicating with the external air. In addition, the ink composition according to the embodiment contains a pigment, an organic solvent, and a resin.

The ink composition according to the embodiment is designed to satisfy required properties based on the structures and properties of a recording apparatus and the ink container, and is manufactured and sold in association with a specific recording apparatus and ink container. In the invention, there is provided an ink composition in which a thin ink film is not easily formed at a boundary portion A by setting a static contact angle to 10° or more with respect to a member constituting an inner side of a wall 370 of the ink container filled with the ink composition according to the embodiment. Components included in the ink composition according to the embodiment (hereinafter, simply referred to as "ink") will be described below.

Pigment

The ink according to the embodiment includes a pigment. The pigment has water resistance, gas resistance, light resistance, and the like compared to a dye.

As the pigment, any known pigment such as inorganic pigments and organic pigments can be used. The inorganic pigments are not limited to the following, and examples thereof include titanium oxide, iron oxide, calcium carbonate, barium sulfate, aluminum hydroxide, barium yellow, cadmium red, chrome yellow, carbon black, Prussian blue, and metal powders.

The organic pigments are not limited to the following, and examples thereof include azo pigments, polycyclic pigments, nitro pigments, nitroso pigments, and aniline black. Among these, at least any of azo pigments and polycyclic pigments is preferable. The azo pigments are not limited to the following, and examples thereof include an azo lake, an insoluble azo pigment, a condensed azo pigment, and a chelate azo pigment. The polycyclic pigments are not limited to the following, and examples thereof include a phthalocyanine pigment, a perylene pigment, a perynone pigment, an anthraquinone pigment, a quinacridone pigment, a dioxazine pigment, an indigo pigment, a thioindigo pigment, an isoindolinone pigment, a quinophthalone pigment, an azomethine-based pigment, and a rhodamine B lake pigment.

The volume-based average particle size of the pigment (hereinafter, simply referred to as the "average particle size of the pigment") is preferably 30 nm or greater and 300 nm or smaller, and more preferably 50 nm or greater and 200 nm or smaller. When the average particle size of the pigment is within the aforementioned range, the color developing properties of the pigment are improved or the clogging of the filter or the recording head is reduced in some cases.

The average particle size of the pigment can be measured by a particle size distribution measuring apparatus which takes a laser diffraction scattering method as a measurement principle. As the particle size distribution measuring apparatus, for example, a particle size distribution meter (such as "Microtrack UPA" manufactured by Nikkiso Co., Ltd.) which takes a dynamic light scattering method as a measurement principle can be used.

The pigment may be a surface-treated pigment or a pigment using a dispersant or the like from the viewpoint of improving dispersibility in the ink. The surface-treated pigment refers to a pigment that is dispersible in an aqueous solvent by directly or indirectly bonding a hydrophilic group (such as a carboxyl group, sulfo group, or phosphate group) to the surface of the pigment by a physical or chemical treatment (hereinafter, referred to as a "self-dispersion type pigment"). In addition, the pigment using a dispersant refers to a pigment that is dispersed using a surfactant or resin (hereinafter, referred to as a "polymer dispersion type pigment"), and any known material can be used as the surfactant or resin. Further, in the "polymer dispersion type pigment", a pigment covered by resin is also included. The pigment covered by resin can be obtained by an acid precipitation method, a phase inversion emulsification, a mini-emulsion polymerization method, or the like. Since the content of resin in the ink can be reduced, the self-dispersion type pigment is preferably used.

Resin

The ink according to the embodiment includes resin. The resin has a function of improving the adhesion of the ink that is attached to a recording medium, improving the dispersibility of the aforementioned pigment, and the like.

As the resin, any type of resin such as resin in a dissolved state, or resin in a particle state such as emulsion, can be used. For example, when the resin has a particle shape (hereinafter, referred to as a "resin particle"), the volume-based average particle size of the resin particles (hereinafter, simply referred to as the "average particle size of the resin particles") is preferably 30 nm or greater and 300 nm or smaller, and more preferably 50 nm or greater and 200 nm or smaller. When the average particle size of the resin particles is within the aforementioned range, there is a tendency that the adhesion of the ink that is attached to a recording medium is improved or the clogging of the filter or the recording head is reduced. The average particle size of the resin particles can be measured in the same manner as in the description of the average particle size of the pigment.

The average particle size of the resin particles can be measured by a particle size distribution measuring apparatus which takes a laser diffraction scattering method as a measurement principle. As the particle size distribution measuring apparatus, for example, a particle size distribution meter (such as "Microtrack UPA" manufactured by Nikkiso Co., Ltd.) which takes a dynamic light scattering method as a measurement principle can be used.

As for the resin to be used herein, the glass transition temperature is preferably 25° C. or lower, more preferably 10° C. or lower, and still more preferably 0° C. or lower. When the glass transition temperature of the resin is 25° C. or lower, aggregates are not easily generated. In addition, even when aggregates are generated, the fluidity of the aggregates including the resin and the pigment is increased, and thus, the clogging of the filter or the nozzle does not easily occur.

Examples of the resin include acrylic resins, styrene acrylic resins, fluorene resins, urethane resins, polyolefin resins, rosin-modified resins, terpene resins, polyester resins, polyamide resins, epoxy resins, vinyl chloride resins, vinyl chloride-vinyl acetate copolymers, and ethylene-vinyl acetate resins. These resins may be used singly or in combination of two or more. In addition, the resin may be used as resin emulsion or aqueous resin.

The content of the resin is preferably less than 1 part by mass, and more preferably 0.1 part by mass or more and 0.5 parts by mass or less, with respect to 1 part by mass of the pigment in the ink in terms of solid content. When the content of the resin is less than the content of the pigment, the film formation of the resin attached to a recording medium is not easily inhibited by the pigment, and thus, there is a tendency that adhesion of ink to the recording medium is improved.

A total of the content of the resin and the content of the pigment is preferably 20% by mass or less with respect to the total mass (100% by mass) of the ink in terms of solid content. When the total content is 20% by mass or less, the generation of aggregates can be reduced in the ink. The total of the content of the resin and the content of the pigment is more preferably 2% by mass or more and 15% by mass or less, still more preferably 3% by mass or more and 15% by mass or less, and even still more preferably 3% by mass or more and 10% by mass or less.

Further, when a filter is provided in the ink container, the average particle size of the pigment is preferably 1/10 of the diameter of the filter or smaller, more preferably 1/500 of the diameter of the filter or greater and 1/20 of the diameter of the filter or smaller, and still more preferably 1/300 of the diameter of the filter or greater and 1/30 of the diameter of the filter or smaller. In addition, when the resin has a particle shape, the average particle size of both the pigment and the resin is preferably 1/10 of the diameter of the filter or smaller, more preferably 1/500 of the diameter of the filter or greater and 1/20 of the diameter of the filter or smaller, and still more preferably 1/300 of the diameter of the filter or greater and 1/30 of the diameter of the filter or smaller. When the relationship is satisfied, the clogging of the filter does not easily occur and comparatively huge coarse particles exerting large influence on discharge can be captured by the filter.

Organic Solvent

The ink according to the embodiment contains an organic solvent. Examples of the organic solvent include alkanediols, polyhydric alcohols, glycol ethers, nitrogen-containing heterocyclic compounds, urea, and urea derivatives. These may be used singly or in combination of two or more.

Examples of alkanediols include 1,2-alkanediol having 4 to 8 carbon atoms, (for example, 1,2-butanediol, 1,2-pentanediol, 1,2-hexanediol, or 1,2-octanediol), 2-methyl-1,3-propanediol, 2,2-dimethyl-1,3-propanediol, and 2-ethyl-1,3-hexanediol. The alkanediols have a function of improving wettability to a recording medium or suppressing drying and solidification of the ink on the nozzle surface of the recording head. When the ink contains the alkanediols, the content thereof can be set to, for example, 0.1% by mass or more and 20% by mass or less with respect to the total mass of the ink. In order to prevent wettability from being increased excessively, the content is more preferably 0.5% by mass or more and 5% by mass or less, still more preferably 0.5% by mass or more and 3% by mass or less, and even still more preferably 0.5% by mass or more and 2% by mass or less.

Among the alkanediols, 1,2-alkanediols having 5 or carbon atoms are preferably used. This is because, regardless of the fact that these compounds improve permeability and wettability of ink to a recording medium, the surface tension of the ink is slightly lowered.

Examples of glycol ethers include alkylene glycol monoethers and alkylene glycol diethers.

Examples of alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

The glycol ethers may be used singly or in combination of two or more. The glycol ethers can be preferably used because regardless of the fact that these compounds improve permeability and wettability of ink to a recording medium, the surface tension of the ink is slightly lowered. When the ink contains the glycol ethers, the content thereof is preferably 0.05% by mass or more and 6% by mass or less with respect to the total mass of the ink, for example. Further, since the wettability is appropriately controlled in consideration of the precipitation of aggregates, the content is preferably 0.2% by mass or more and 4% by mass or less.

Moisturizer

Examples of polyhydric alcohols (excluding the alkanediols) include ethylene glycol, propylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 2-methyl-2,4-pentanediol, 3-methyl-1,5-pentanediol, diethylene glycol, triethylene glycol, tetraethylene glycol, dipropylene glycol, trimethylolpropane, and glycerin. The polyhydric alcohols can be preferably used from the viewpoint of reducing clogging, defective discharge, or the like by suppressing drying and solidification of the ink on the nozzle surface of the head. When the ink contains the polyhydric alcohols, the content thereof can be, for example, 5% by mass or more, and further, 5% by mass or more and 30% by mass or less with respect to the total mass of the ink.

Examples of nitrogen-containing heterocyclic compounds include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and hydantoin. Examples of urea and urea derivatives include urea, ethylene urea, tetramethyl urea, and thiourea. These may be used singly or in combination of two or more. These can be preferably used from the viewpoint of reducing clogging, defective discharge, or the like by suppressing drying and solidification of the ink on the nozzle surface of the head, similar to the polyhydric alcohols. When the ink contains these materials, the content thereof is preferably, for example, 0.5% by mass or more and 10% by mass or less, and more preferably 1% by mass or more and 5% by mass or less with respect to the total mass of the ink.

Among the polyhydric alcohols, nitrogen-containing heterocyclic compounds, urea, and urea derivatives functioning as a moisturizer, glycerin and at least one selected from the group consisting of other polyhydric alcohols (excluding glycerin among the aforementioned polyhydric alcohols), nitrogen-containing heterocyclic compounds, urea, and urea derivatives are preferably used in combination. Such combination suppresses both long-term moisture evaporation and rapid moisture evaporation occurring on the wall surface of the ink chamber. In this case, more preferable examples of polyhydric alcohols include propylene glycol, dipropylene glycol, 1,3-butanediol, diethylene glycol, triethylene glycol, and trimethylolpropane. Among the polyhydric alcohols, propylene glycol, dipropylene glycol, diethylene glycol, and 1,3-butanediol are preferable from the viewpoint of preventing precipitates. In addition, as the nitrogen-containing heterocyclic compounds, pyrrolidone derivatives, and hydantoin are preferable and 2-pyrrolidone, and hydantoin are more preferable. Moreover, as the urea derivatives, ethylene urea, tetramethyl urea, and thiourea are preferable.

When the ink according to the embodiment includes at least one selected from the group consisting of 1,2-alkanediol having 4 to 8 carbon atoms, 2-methyl-1,3-propanediol, 2,2-dimethyl-1,3-propanediol, 2-ethyl-1,3-hexanediol, and glycol ether, from the viewpoint of preventing the precipitation of aggregates, a moisturizer in which glycerin and at least one selected from the group consisting of other polyhydric alcohols (excluding glycerin among the aforementioned polyhydric alcohols), nitrogen-containing heterocyclic compounds, urea, and urea derivatives are used in combination is preferably added.

Water

The ink according to the embodiment may contain water. When the ink according to the embodiment is an aqueous ink (ink containing 50% by mass or more of water), water is a component which serves as the main solvent of the ink and evaporates and scatters due to drying. Examples of the water include one in which ionic impurities are removed as much as possible, such as pure water and ultrapure water, such as ion exchanged water, ultrafiltration water, reverse osmosis water, and distilled water. Moreover, when water which is sterilized by radiation of ultraviolet rays, addition of hydrogen peroxide, and the like is used, the generation of mold or bacteria can be prevented when storing the ink over a long period of time.

Surfactant

The ink according to the embodiment may contain a surfactant. The surfactant has a function of reducing the surface tension, and increasing the wettability with a recording medium. Among surfactants, acetylene glycol surfactants, silicone surfactants, fluorochemical surfactants, and polyoxyethylene alkyl ether surfactants can be preferably used, for example.

The acetylene glycol surfactants are not particularly limited, and examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (All Product names, manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (All Product names, manufactured by Nisshin Chemical Co., Ltd.), and Acetylenol E00, E00P, E40, and E100 (All Product names, manufactured by Kawaken Fine Chemicals Co., Ltd.).

The silicone surfactants are not particularly limited and polysiloxane compounds are preferably mentioned. The polysiloxane compounds are not particularly limited, and examples thereof include polyether modified organosiloxane. Examples of commercially-available products of polyether modified organosiloxane include, BYK-306, BYK-307, BYK-333, BYK-341, BYK-345, BYK-346, and BYK-348 (All Product names, manufactured by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (All Product names, manufactured by Shin-Etsu Chemical Co., Ltd.).

As the fluorochemical surfactants, fluoride modified polymer is preferably used, and specific examples thereof include Megaface series (manufactured by DIC corporation), Zonyl series (manufactured by Du Pont Kabushiki Kaisha), and BYK-340 (manufactured by BYK Chemie Japan).

The polyoxyethylene alkyl ether surfactants are not particularly limited and can be selected appropriately according to purpose. For example, one selected from compounds expressed by the formula $C_nH_{n+1}O(C_mH_{2m}O)_lH$ (however, in the formula, n represents an integer of 5 or more, and m and l represent integers of 1 or more) is preferable, and specific examples thereof include $C_8H_{17}O(C_2H_4O)_2H$, $C_{10}H_{21}O(C_2H_4O)_4H$, $C_{12}H_{25}O(C_2H_4O)_3H$, $C_{12}H_{25}O(C_2H_4O)_7H$, $C_{12}H_{25}O(C_2H_4O)_{12}H$, $C_{13}H_{27}O(C_2H_4O)_3H$, $C_{13}H_{27}O(C_2H_4O)_5H$, $C_{13}H_{27}O(C_2H_4O)_7H$, $C_{13}H_{27}O(C_2H_4O)_9H$, $C_{13}H_{27}O(C_2H_4O)_{12}H$, $C_{13}H_{27}O(C_2H_4O)_{20}H$, $C_{13}H_{27}O(C_2H_4O)_{30}H$, and $C_{24}H_{29}O(C_2H_4O)_{30}H$. These may be used singly or in combination of two or more. However, in the latter case, it is effective when one compound is not easily dissolved in the ink, and it is advantageous from the viewpoint of improving solubility in the ink. As the polyoxyethylene alkyl ether surfactants, commercially-available products may be used and examples of the commercially-available product include BT series (manufactured by Nikko Chemicals Co., Ltd.), Softanol series (manufactured by NIPPON SHOKUBAI CO., LTD.), and Dispanol (manufactured by NOF CORPORATION).

Among the aforementioned surfactants, in consideration of reduction of wettability and surface tension, silicone surfactants, acetylene glycol surfactants, and polyoxyethylene alkyl ether surfactants are preferable and acetylene glycol surfactants, and polyoxyethylene alkyl ether surfactants are more preferable.

Other Components

For the purpose of improving performance, the ink according to the embodiment may contain wax particles (for example, polyolefin wax, and paraffin wax), amphoteric ion compounds (for example, betaine compounds, amino acids, and derivatives thereof), saccharides (for example, glucose, mannose, fructose, ribose, xylose, arabinose, galactose, aldonic acid, sorbitol, maltose, cellobiose, lactose, sucrose, trehalose, maltotriose, and hydrogenated starch hydrolysate), sugar alcohols, hyaluronic acids, urea, an antiseptic/antifungal agent (for example, sodium benzoate, sodium pentachlorophenol, sodium 2-pyridinethiol-1-oxide, sodium sorbate, sodium dehydroacetate, and 1,2-dibenzinethiazoline-3-on), a pH adjuster (for example, potassium dihydrogen phosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate), and a chelating agent (for example, ethylenediamine tetraacetic acid, salts thereof (disodium hydrogen ethylenediaminetetraacetate and the like)).

1.2 Physical Properties

The ink according to the embodiment preferably has a surface tension of 20 mN/m or more and 50 mN/m or lower, more preferably 25 mN/m or more and 35 mN/m or lower, and still more preferably 30 mN/m or more and 35 mN/m or lower at 20° C. from the viewpoint of the balance between the recording quality and the reliability as the ink jet recording ink composition. When the surface tension of the ink is within the aforementioned range, the wettability of the ink to the inner side of the wall 370 can be lowered while maintaining the wettability of the ink to a recording medium. The surface tension can be measured by, for example, determining the surface tension when a platinum plate is wetted with the ink in a 20° C. environment using an automatic surface tension meter CBVP-Z (manufactured by Kyowa Interface Science Co., LTD.).

From the viewpoint of the balance between the recording quality and the reliability as the ink jet recording ink composition, the ink according to the embodiment preferably has a viscosity of 2 mPa·s or more and 15 mPa·s or lower and more preferably 2 mPa·s or more and 10 mPa·s or lower at 20° C. The viscosity can be measured by increasing a shear rate to 10 to 1000 in a 20° C. environment using a viscoelasticity tester MCR-300 (manufactured by Paar Physica Co., Ltd.), and a viscosity value obtained at a shear rate of 200 can be adopted.

When the ink according to the embodiment includes calcium ions and magnesium ions, a total of concentration values of both is preferably 30 ppm or less. When the total is 30 ppm or less, the aggregation of the pigment and the resin at a boundary portion A described later can be reduced. The total of the aforementioned ion concentration is more preferably 15 ppm or less. The aforementioned ion concentration can be measured using an ICP emission spectral analyzer, and examples of the emission spectral analyzer include SPS5100 (manufactured by SII Nano Technology Inc.).

2. Properties of Ink Composition with Respect to Ink Container 2.1. Contact Angle Between Ink Chamber and Ink Composition Static Contact Angle In ink containers 30 which will be described later, a thin ink film is easily formed at the boundary portion A where the inner side of the wall 370 which partitions an ink chamber 340 (that is, a portion which can be in contact with the ink in the ink chamber 340) is in contact with a gas-liquid interface at a liquid surface LF of the ink. Here, in order to form an image with satisfactory image quality with the ink, it is necessary for the ink to have a predetermined wettability, and when the surfactant and some of the organic solvents are included in the ink as a wetting agent, the wettability can be obtained. Since the ink having wettability as described above is used, a member is wetted with the ink to form a thin film. Particularly, when wettability between a member constituting the inner side of the wall 370 and the ink composition is high, the inner side of the wall 370 is easily wetted with the ink, and thus, a concave meniscus is formed.

Figure 4:
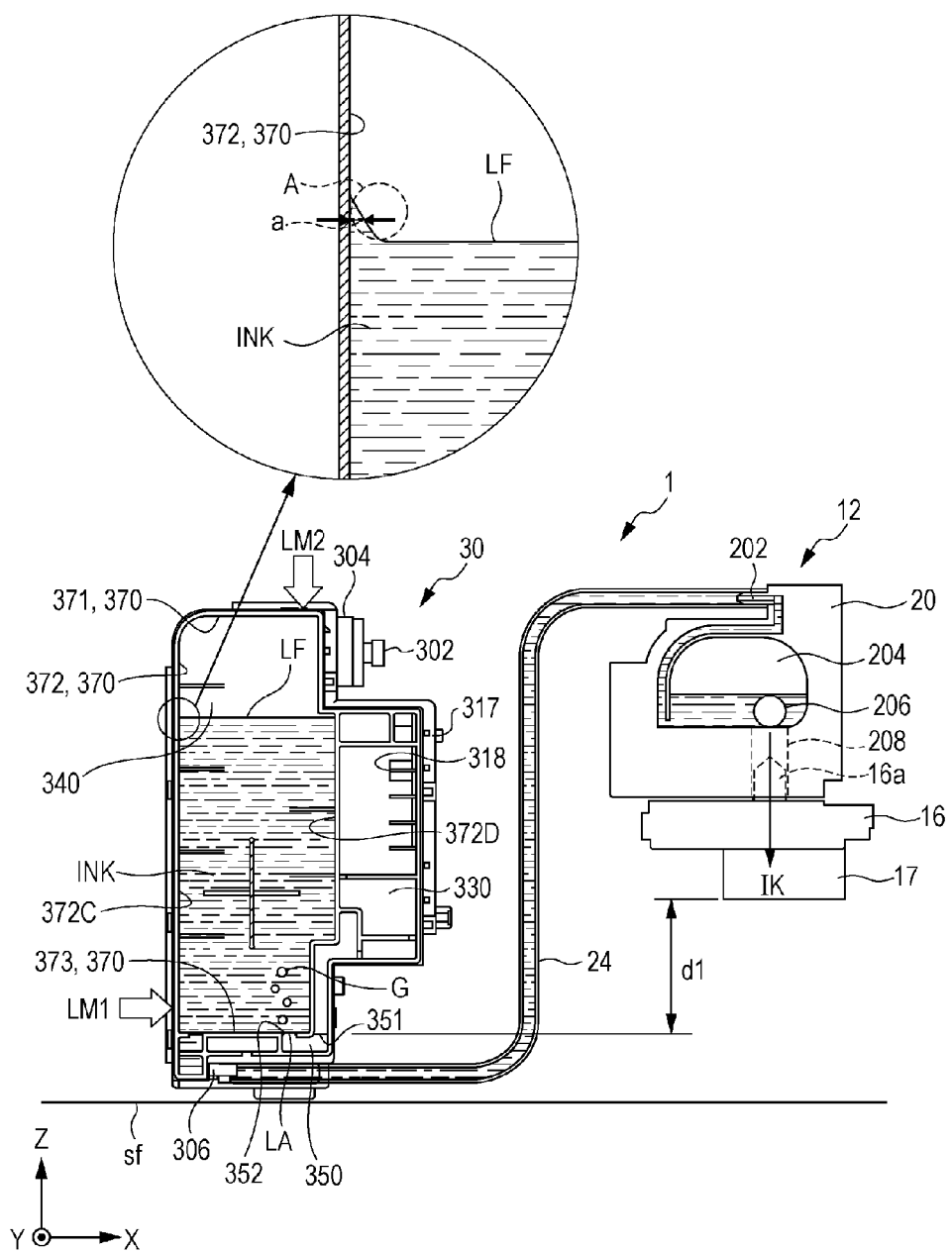
FIG. 4 is a view schematically showing a part of the inner structure of the ink jet recording apparatus according to the embodiment of the invention.

Specifically, as shown in the partially enlarged view of FIG. 4, a concave meniscus is formed at the boundary portion A where the inner side of the wall 370 is in contact with the liquid surface LF of the ink. In the concave meniscus portion, a distance a between the gas-liquid interface of the ink and the inner side of the wall 370 is short, and thus, a thin film is easily formed due to drying of the ink. Here, the inventors have found that when a static contact angle between the member constituting the inner side of the wall 370 and the ink composition is set to 10° or more, a thin ink film is not easily formed at the boundary portion A. Accordingly, inconveniences such as the clogging of the head and the filter can be reduced.

It is necessary to set the static contact angle CA between the member constituting the inner side of the wall 370 and the ink composition to be 10° or more, preferably 20° or more, more preferably 30° or more, still more preferably 20° or more and 60° or less, and particularly preferably 30° or more and 60° or less. When the static contact angle CA is 10° or more, there is a tendency that the formation of a thin ink film at the boundary portion A is further reduced.

Further, when the static contact angle CA is 60° or less, the wettability of the ink to various recording mediums such as paper, plastics, nozzles of a head becomes satisfactory, and thus, an image with excellent image quality can be recorded. In addition, excellent discharge stability can be realized.

Change in Static Contact Angle with Moisture Evaporation

The inventors have found that when the static contact angle CA between the member constituting the inner side of the wall 370 and the ink composition is 10° or more, and the wettability of the ink composition does not easily change before and after evaporation of moisture included in the ink composition, formation of a thin ink film at the boundary portion A is further reduced in some cases.

That is, as the moisture included in the ink composition present at the boundary portion A evaporates, the concentration of the wetting agent (for example, the aforementioned surfactant, alkanediols, polyhydric alcohols, and glycol ethers) included in the ink composition present at the boundary portion A increases. Then, the wettability of the ink composition (ink composition after moisture evaporation) at the boundary portion A is improved compared to the wettability of the ink composition before moisture evaporation. At this time, when the wettability of the ink composition after moisture evaporation is increased excessively compared to the wettability of the ink composition before moisture evaporation, a thin ink film is easily formed at the boundary portion A, and thus, the amount of aggregates in the ink may increase.

Here, as a result of an intensive study, the inventors have found that when a static contact angle between the ink composition before moisture evaporation and the member constituting the inner side of the wall 370 is set to $CA_0$, and a static contact angle between the ink composition after moisture evaporation and the member constituting the inner side of the wall 370 is set to $CA_1$, formation of a thin ink film at the boundary portion A can be further reduced by satisfying the following conditions (1) and (2).

$$10°\leq CA_0, \text{ and } 10°\leq CA_1 \quad \text{Condition (1):}$$

$$0°\leq CA_0 - CA_1 \leq 5° \quad \text{Condition (2):}$$

The static contact angle $CA_0$ before moisture evaporation is the same as the static contact angle CA described in the aforementioned section "Static Contact Angle of 2.1. Contact Angle between Ink Chamber and Ink Composition". In addition, the "ink composition after moisture evaporation" when $CA_1$ is obtained refers to an ink composition when 1% by mass of moisture with respect to the total mass (100% by mass) of the ink composition before moisture evaporation evaporates.

It is preferable that $CA_0$ and $CA_1$ satisfy the following condition (1-1), and it is more preferable that $CA_0$ and $CA_1$ satisfy the following condition (1-2). Accordingly, a thin ink film is less easily formed at the boundary portion A.

$$20°\leq CA_0, \text{ and } 20°\leq CA_1 \quad \text{Condition (1-1):}$$

$$30°\leq CA_0, \text{ and } 30°\leq CA_1 \quad \text{Condition (1-2):}$$

When an amount of change in the static contact angle before and after moisture evaporation at the boundary portion A is small, a thin ink film is less easily formed, and thus, it is preferable that the following condition (2-1) be satisfied.

$$0°\leq CA_0 - CA_1 \leq 3° \quad \text{Condition (2-1):}$$

The content of the organic solvent included in the ink composition is preferably 5% by mass or more and 40% by mass or less, more preferably 5% by mass or more and 30% by mass or less, and still more preferably 10% by mass or more and 30% by mass or less with respect to the total mass (100% by mass) of the ink composition in consideration of moisture retention, permeability, aggregate generation prevention, and the like. For the same reason, the content of the organic solvent is preferably more than one time and 10 times or less, and more preferably 2 times or more and 6 times or less of the total of the content of the pigment and the content of the resin on a mass basis.

The static contact angle in the invention is measured according to a sessile drop method of JIS R 3257 (Test Method for Surface Wettability of Glass Substrate) except that a glass substrate is changed to the member (prepared in a plate shape) constituting the inner side of the wall and pure water is changed to the ink composition. Specifically, the static contact angle can be measured by a sessile drop method using an automatic contact angle measuring apparatus OCAH 200 (product name, manufactured by Data Physics Corporation) or the like.

Receding Contact Angle

Figure 13:
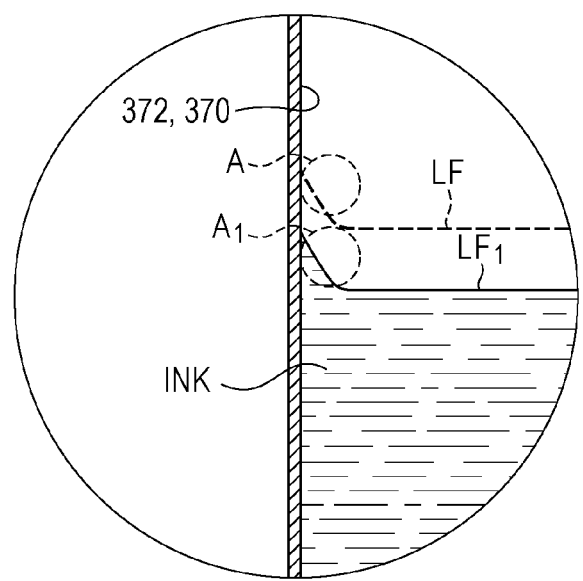
FIG. 13 is a view schematically showing a change in a liquid surface of ink in an ink chamber of the ink container according to the embodiment of the invention.

FIG. 13 is a view schematically showing a state in which the liquid surface LF of the ink is lowered by supplying the ink to a recording head 17. As shown in FIG. 13, when the liquid surface of the ink is lowered from LF to $LF_1$, the concave meniscus formed at the boundary portion A is lowered to a boundary portion $A_1$. At this time, it is preferable that the ink does not remain on a wall surface between the boundary portion A and the boundary portion $A_1$. That is, when a receding contact angle which will be described later in a dynamic contact angle is sufficiently large, the ink does not easily remain on a wall surface shown above the liquid surface of the ink (that is, a wall surface between the boundary portion A and the boundary portion $A_1$ in FIG. 13) by consuming the ink in the ink chamber 340. Accordingly, since a thin ink film is not easily formed on the wall surface, the generation of precipitates can be reduced.

Specifically, a receding contact angle $CA_R$ between the member constituting the inner side of the wall 370 (a support 380) and the ink composition is preferably 5° or more, more preferably 5° or more and 50° or less, and still more preferably 10° or more and 40° or less. When the receding contact angle $CA_R$ is 5° or more, there is a tendency that the ink does not easily remain on the wall surface shown above the liquid surface of the ink by consuming the ink. In addition, when the receding contact angle $CA_R$ is 50° or less, the wettability of the ink to various recording mediums such as paper or plastics becomes satisfactory, and thus, an image with excellent image quality can be recorded.

The receding contact angle in the invention can be measured by an expansion/contraction method, and specifically, the receding contact angle refers to a contact angle measured when droplets of the ink composition are attached on the member (prepared in a plate shape) constituting the inner side of the wall and the droplets are contracted using an automatic contact angle measuring apparatus OCAH 200 (product name, manufactured by Data Physics Corporation) or the like.

As a method of measuring a receding contact angle, the following measurement method can be used. Using an automatic contact angle measuring apparatus OCAH 200 (product name, manufactured by Data Physics Corporation), a contact angle (receding contact angle $CA_R$) is measured when 8.5 μl of ink droplets are attached on a plate-like sample prepared with the aforementioned "static contact angle CA ($CA_0$) before moisture evaporation", expanded at a rate of 8.5 μl/sec for 5 seconds, and then, contracted at a rate of 8.5 μl/sec for 5 seconds under a 20° condition. The measurement is conducted for 2.0 seconds to 2.4 seconds after the contraction starts at an interval of 0.1 second and an average value of 5 points is set as a receding contact angle.

Change in Surface Tension with Ink Solvent Content Evaporation

The ink composition of the invention is preferable from the viewpoint of preventing the precipitation of aggregates when a change in the surface tension with ink solvent content evaporation satisfies the following conditions. When an evaporation amount from the initial ink composition is large, there is a high possibility of evaporation of solvent contents other than water, and thus, it is expressed as an "ink solvent content".

In addition, the following $\gamma_{M0}$, $\gamma_{M1}$, $\gamma_{M2}$, and $\gamma_{M3}$ respectively represent surface tensions before ink solvent content evaporation and ink compositions after 3.5% by mass, 7% by mass, and 12% by mass of ink solvent contents evaporate. The "ink composition after ink solvent content evaporation" refers to an ink composition when a predetermined percent by mass of ink solvent content evaporates with respect to the total mass (100% by mass) of the ink composition before the ink solvent content evaporation.

The ink composition according to the embodiment is preferably an ink composition which satisfies two or more of the following conditions (3-1), (3-2), and (3-3), or satisfies all the following conditions (4-1) to (4-3). Moreover, it is preferable that the ink composition satisfy all the following conditions (3-1) to (3-3).

| | |
|---|---|
| $\gamma_{M1}-\gamma_{M0}>0(mN/m)$ | Condition (3-1): |
| $\gamma_{M2}-\gamma_{M0}>0(mN/m)$ | Condition (3-2): |
| $\gamma_{M3}-\gamma_{M0}>0(mN/m)$ | Condition (3-3): |
| $\gamma_{M1}-\gamma_{M0}>-0.5(mN/m)$ | Condition (4-1): |
| $\gamma_{M2}-\gamma_{M0}>-0.5(mN/m)$ | Condition (4-2): |
| $\gamma_{M3}-\gamma_{M0}>-0.5(mN/m)$ | Condition (4-3): |

An ink composition in which the surface tension is not lowered or the lowered amount is small when the ink solvent content evaporates is an ink composition having a long-term storage stability. The ink composition which satisfies the above conditions can be obtained by selecting the solvents described in the aforementioned section "Moisturizer" or adjusting an addition amount of the solvent.

2.2 Contact Angle Between Support and Ink Composition

Static Contact Angle

From the same viewpoint as in the above description of "Static Contact Angle of 2.1. Contact Angle between Ink Chamber and Ink Composition", when a static contact angle $CA_S$ between a member constituting the support 380 (which will be described later) and the ink composition is large, a thin ink film is not easily formed on the support 380. Specifically, the static contact angle $CA_S$ between the member constituting the support 380 and the ink composition is preferably 10° or more, more preferably 20° or more, and still more preferably 30° or more. Even when an ink including a wetting agent is used, formation of a thin ink film is reduced on the support 380 by setting the static contact angle $CA_S$ to be 10° or more.

Change in Static Contact Angle with Moisture Evaporation

From the same viewpoint as in the above description "Change in Static Contact Angle with Moisture Evaporation of 2.1. Contact Angle between Ink Chamber and Ink Composition", when a static contact angle $CA_{S0}$ between the member constituting the support 380 and the ink composition is 10° or more, and the wettability of the ink composition before and after evaporation of moisture included in the ink composition does not easily change, there is a tendency that the formation of a thin ink film is further reduced on the support 380.

Specifically, when a static contact angle between the member constituting the support 380 and the ink composition before moisture evaporation is set to $CA_{S0}$, and a static contact angle between the member constituting the support 380 and the ink composition after moisture evaporation is set to $CA_{S1}$, formation of a thin ink film can be satisfactorily reduced on the support 380 by satisfying the following conditions (5) and (6).

$10°\leq CA_{S0}$, and $10°\leq CA_{S1}$  Condition (5):

$0°\leq CA_{S0}-CA_{S1}\leq 5°$  Condition (6):

The static contact angle $CA_{S0}$ before moisture evaporation is the same as the static contact angle $CA_S$ described in the aforementioned section "Static Contact Angle of 2.2. Contact Angle between Support and Ink Composition". In addition, the "ink composition after moisture evaporation" when $CA_{S1}$ is obtained refers to an ink composition when 1% by mass of moisture with respect to the total mass (100% by mass) of the ink composition before moisture evaporation evaporates.

It is preferable that $CA_{S0}$ and $CA_{S1}$ satisfy the following condition (5-1), and it is more preferable that $CA_{S0}$ and $CA_{S1}$ satisfy the following condition (5-2). Accordingly, a thin ink film is less easily formed on the support 380.

$20°\leq CA_{S0}$, and $20°\leq CA_{S1}$  Condition (5-1):

$30°\leq CA_{S0}$, and $30°\leq CA_{S1}$  Condition (5-2):

In addition, a thin ink film is less easily formed on the support 380, and thus, it is more preferable that the following condition (6-1) be satisfied.

$0°\leq CA_{S0}-CA_{S1}\leq 3°$  Condition (6-1):

Receding Contact Angle

From the same viewpoint as in the above description "Receding Contact Angle of 2.1. Contact Angle between Ink Chamber and Ink Composition", when a receding contact angle $CA_{RS}$ between the member constituting the support 380 and the ink composition is large, a thin ink film is not easily formed on the support 380.

Specifically, the receding contact angle $CA_{RS}$ between the member constituting the support 380 and the ink composition is preferably 5° or more, more preferably 5° or more and 50° or less, and still more preferably 10° or more and 40° or less. When the receding contact angle $CA_{RS}$ is 5° or more, there is a tendency that the ink does not easily remain on the support 380 shown above the liquid surface of the ink by consuming the ink. In addition, when the receding contact angle $CA_{RS}$ is 50° or less, the wettability of the ink to various recording mediums such as paper or plastics becomes satisfactory, and thus, an image with excellent image quality can be recorded.

3. Filling State of Ink Composition

Figure 14:
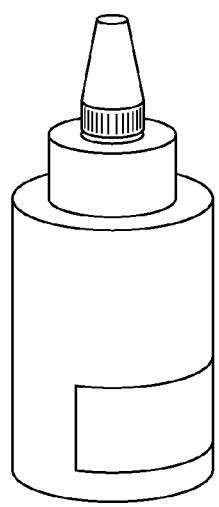
FIG. 14 is a view showing a bottle which contains an ink composition according to an embodiment of the invention.

The aforementioned ink composition is designed to satisfy required properties based on the structures and properties of a recording apparatus and the ink container, and is manufactured and sold in association with a specific recording apparatus and ink container. That is, a specific ink container which will be described later is filled with the ink composition according to the embodiment, and thus, the ink composition may be contained in another container instead of filling of the ink composition of the ink container in advance. Examples of another container include an ink bottle shown in FIG. 14.

For the aforementioned reason, the ink composition according to the embodiment and the ink container which will be described later (for example, a state in which the ink container is not filled with the ink composition) may be considered as a set. In addition, the ink container which will be described later may be filled with the ink composition according to the embodiment.

4. Ink Container

An ink container according to an embodiment of the invention is used by connection to a recording apparatus, and includes an ink chamber which can be refilled with the aforementioned ink composition, and an ink pouring port which is openable and closable. The ink chamber can communicate with the external air and a static contact angle between the aforementioned ink composition and the member constituting the inner side of the wall partitioning the ink chamber is 10° or more.

Examples of a recording apparatus on which the ink container according to the embodiment is mounted include an ink jet recording apparatus, and the detailed description will be made with reference to the drawings. In order to facilitate understanding of the structure of an ink jet recording apparatus according to an embodiment, the size may be appropriately changed.

Figure 1B:
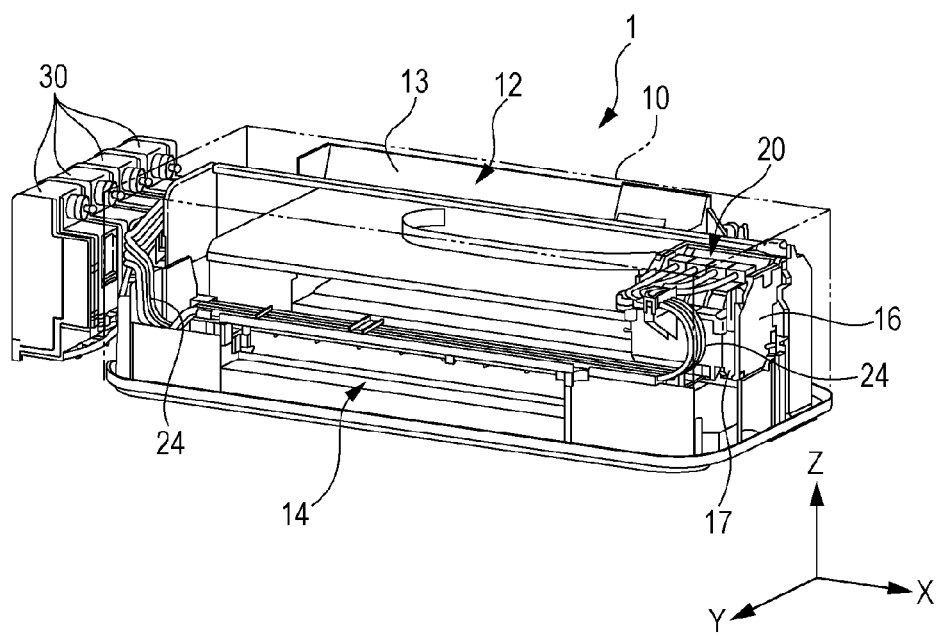

FIGS. 1A and 1B are perspective views schematically showing an ink jet recording apparatus 1. Specifically, FIG. 1A shows a state in which the ink containers 30 (refer to FIG. 1B) are housed in a container housing case 51. FIG. 1B shows a state in which the container housing case 51 is removed. In FIGS. 1A and 1B, X-, Y-, and Z-axes that are perpendicular to each other are shown. The X-, Y-, and Z-axes in FIGS. 1A and 1B correspond to X-, Y-, and Z-axes in other drawings, and in the subsequent drawings, the X-, Y-, and Z-axes are shown as necessary. In the embodiment, the X-axis corresponds to a movement direction of a carriage 16, and the Y-axis corresponds to a direction in which plural ink containers 30 are aligned in a use state. The Z-axis corresponds to a vertical direction (gravity direction).

Figure 2A:
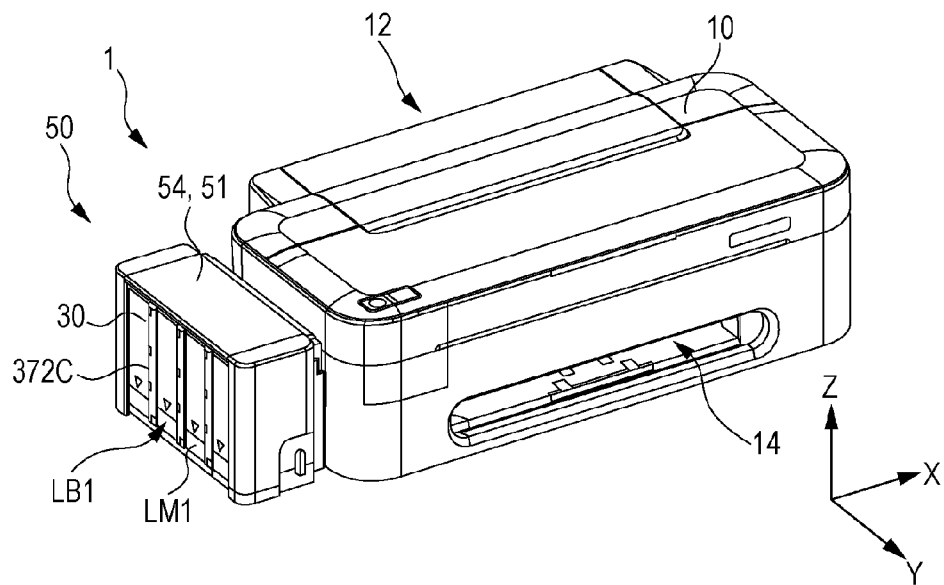
FIGS. 2A and 2B are perspective views schematically showing a state in which a recording unit of the ink jet recording apparatus according to the embodiment of the invention is housed in a recording unit housing case.
Figure 2B:
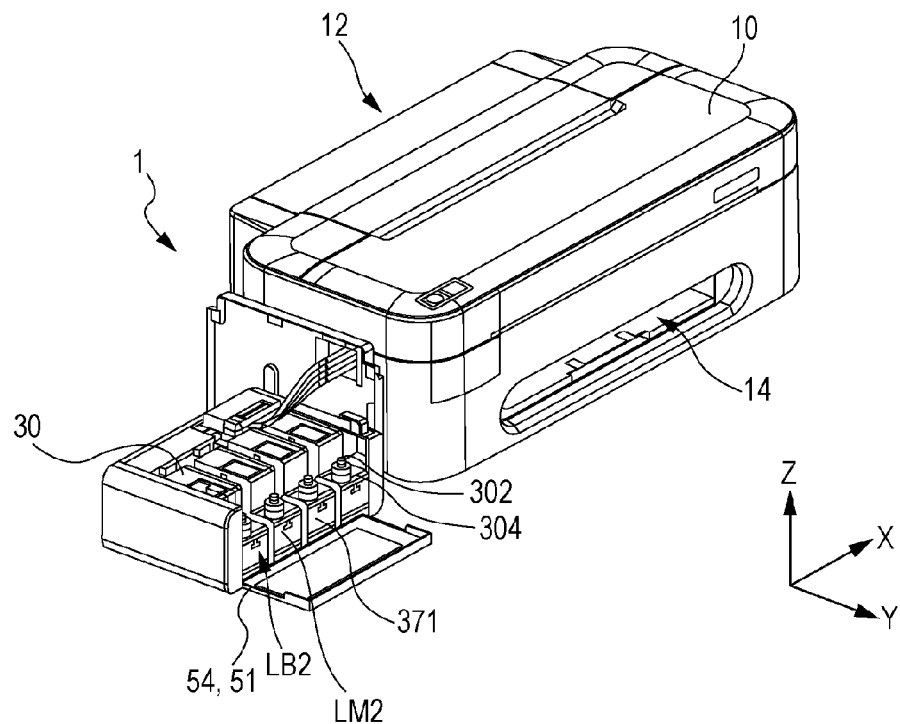

FIGS. 2A and 2B are perspective views schematically showing a state in which a recording unit 12 of the ink jet recording apparatus 1 is housed in a recording unit housing case 10. Specifically, FIG. 2A shows a use state (which will be described later) of the ink jet recording apparatus 1, and FIG. 2B shows a pouring state (which will be described later) of the ink jet recording apparatus 1.

As shown in FIGS. 1A to 2B, the ink jet recording apparatus 1 includes the recording unit 12 which records an image on a recording medium, and an ink containing unit 50 which supplies ink to a subtank 20 of the recording unit 12 through an ink supply tube 24.

4.1. Recording Unit

The recording unit 12 includes a recording head 17 which discharges droplets of the ink composition (hereinafter, simply referred to as "ink") to record an image on a recording medium, the subtank 20 which temporarily stores the ink supplied through the ink supply tube 24, a carriage 16 which has the subtank 20 and the recording head 17 mounted thereon and reciprocates in the X-axis direction, a paper feed port 13 which feeds the recording medium, and a paper discharge port 14 which discharges the recording medium. As shown in FIGS. 2A and 2B, the recording unit 12 is housed in the recording unit housing case 10.

The recording head 17 has a nozzle surface (not shown) provided at a position opposite to a recording surface of the recording medium, and discharges ink droplets from plural nozzles (not shown) on the nozzle surface to attach the ink droplets onto the recording surface of the recording medium.

As the ink jet recording method, there are various methods as described below, and any method may be used. For example, a method in which an intense electric field is applied between nozzles and an acceleration electrode disposed in front of the nozzles to continuously discharge ink droplets from the nozzles, and a printing information signal is applied to deflecting electrodes while the ink droplets fly between the deflecting electrodes, or a method in which the ink droplets are discharged in accordance with a printing information signal without being deflected (electrostatic attraction method), a method in which pressure is applied to ink using a small pump, nozzles are mechanically vibrated by a crystal oscillator and the like, and thus ink droplets are forcibly ejected, a method in which pressure is applied to ink using in accordance with a printing information signal a piezoelectric element to discharge ink droplets and perform recording (piezoelectric method), and a method in which ink is heated for generating foam with a microelectrode in accordance with a printing information signal to discharge ink droplets and perform recording (thermal jet method) can be used.

The subtank 20 is connected to the ink container 30 through the ink supply tube 24, and temporarily stores the ink in the ink container 30 to supply the ink to the recording head. In the examples of FIGS. 1A and 1B, the subtank 20 has four subtanks 20BK, 20Cn, 20Ma, and 20Yw, one for each color provided so as to correspond to each color ink in the ink container 30. The material constituting the subtank 20 is not particularly limited, and examples thereof include synthetic resins such as polystyrene or polyethylene. In the embodiment, the ink jet recording apparatus 1 including the subtank 20 has been described as an example, but the invention is not limited thereto. For example, an embodiment in which the recording head 17 and the ink container 30 are directly connected to each other through the ink supply tube 24 without the subtank 20 may be provided.

The carriage 16 has the recording head 17 and the subtank 20 mounted thereon and reciprocates along the X-axis by a carriage moving mechanism (not shown) such as a motor or a timing belt. According to such movement of the carriage 16, the recording head 17 also reciprocates along the X-axis, and thus, image recording onto a recording medium in the X-axis direction is performed by ink discharged from the recording head 17 according to the movement of the carriage 16. In the embodiment, a so-called serial head type ink jet recording apparatus has been described as an example, but the invention is not limited thereto. The ink container according to the invention can be also applied to a so-called line head type ink jet recording apparatus.

The paper discharge port 14 is provided on the front surface of the ink jet recording apparatus 1. The paper feed port 13 is provided on the rear side of the ink jet recording apparatus 1. A recording medium is fed from the paper feed port 13 by setting the recording medium to the paper feed port 13 and performing a recording operation, an image or the like is recorded onto the recording medium inside, and then, printed paper is discharged from the paper discharge port 14. The transport of the recording medium can be performed by a paper feed mechanism (not shown) for feeding the recording medium in the Y-axis direction. In this manner, image recording onto the recording medium in the Y-axis direction can be performed by ink discharged from the recording head 17 according to the movement of the recording medium by the paper feed mechanism.

The recording unit 12 includes a controller (not shown) which controls an overall operation of the ink jet recording apparatus 1. For example, the controller may include a CPU, ROM, and RAM. The controller controls all operations of controlling the carriage 16 to reciprocate, feeding the recording medium, discharging ink from the recording head 17, and supplying ink from the ink container 30 to the subtank 20 (recording head 17).

4.2. Ink Containing Unit and Ink Supply Tube

The ink containing unit 50 includes plural ink containers 30, and the container housing case 51 which houses the ink containers 30. The ink containing unit 50 is provided outside the recording unit housing case 10. The container housing case 51 can be removed from the side of the recording unit housing case 10 while holding the ink containers 30. In addition, the container housing case 51 includes a top case 54 which is openable and closable.

The ink containing unit 50 is provided adjacently to the left side of the recording unit housing case 10 (−X-axis direction of the recording unit housing case 10) when the ink jet recording apparatus 1 is viewed from the front (from +Y-axis direction to −Y-axis direction). In this manner, since the ink containing unit 50 is provided outside the recording unit housing case 10, there is less space restriction compared to a case in which the recording unit 12 and the ink containing unit are provided together in the housing case 10. Accordingly, a more continuous supply type ink container 30 can be provided. The ink container 30 can contain a larger amount of ink than the subtank 20.

The ink supply tubes 24 are provided for each of the plural ink containers 30, connect each ink container 30 with each subtank 20 (recording head 17), and configure a part of an ink flow path which supplies ink in each ink container 30 to each subtank 20 (recording head 17). As the ink supply tube 24, for example, a tubular flexible member (for example, rubber, and elastomer) can be used. When ink is discharged from the recording head 17 and the ink in the subtank 20 is consumed, the ink in the ink container 30 is supplied to the subtank 20 through the ink supply tube 24. Accordingly, the ink jet recording apparatus 1 can perform recording continuously for a long period of time.

A filter (not shown) may be provided in the ink supply tube 24. The filter provided in the ink supply tube 24 captures aggregates generated in the ink chamber 340 and suppresses the inflow of the aggregates into the recording head 17.

The plural ink containers 30 are provided for each ink composition and each color. In the examples in FIGS. 1A to 2B, the aforementioned four ink containers 30 are provided to correspond to the subtanks 20Bk, 20Cn, 20Ma, and 20 Yw. In the embodiment, while the four ink containers 30 are provided to correspond to each color, plural ink containing portions may be provided by partitioning the inside of one ink container with a wall. The ink container can be filled with ink for the container. The configuration of the ink container 30 will described below.

4.2.1. Configuration of Ink Container

Posture of Ink Container

Before the configuration of the ink container 30 is described in detail, first, the posture of the ink container 30 will be described.

In the posture of the ink container 30, there are a use state and a pouring state. The "use state" refers to a posture of the ink container 30 when the ink is supplied to the recording head 17 (subtank 20). In a case where there are plural suppliable postures, when there is a posture recommended at the time of ink supply in a manual or illustration, the posture is set to a use state. When there is a member for fixing the ink container 30 in the ink jet recording apparatus, the posture of the ink container 30 when fixed is set to a use state. FIG. 2A is an example of a use state of the ink container 30. Although not shown in FIG. 2A, an ink pouring port 304 faces the side of the recording unit housing case 10 in the use state of the ink container 30. That is, the axis of the ink pouring port 304 (which will be described later) faces a horizontal direction (specifically, +X-axis direction). At this time, the ink pouring port 304 is closed with a plug member 302 (which will de described later).

The "pouring state" refers to a posture of the ink container 30 at the time of ink pouring (also referred to as filling or refilling) into the ink container 30 (ink chamber 340). FIG. 2B shows a pouring state of the ink container 30. When the ink is poured into the ink container 30, a user places the ink container 30 in a pouring state shown in FIG. 2B by removing the container housing case 51 from the side of the recording unit housing case 10, and opening the top case 54. In the pouring state, the axis of the ink pouring port 304 faces a vertical direction (specifically, +Z-axis direction). The user places the ink container 30 in the pouring state shown in FIG. 2B, and then, the plug member 302 with which the ink pouring port 304 is closed is removed in order to pour the ink. After completing ink pouring, the user closes the ink pouring port 304 with the plug member 302. Then, the user attaches the container housing case 51 to the side of the recording unit housing case 10, and the state of the apparatus returns to a use state in FIG. 2A.

State Identification Portion

In the use state shown in FIG. 2A, a third side surface 372C of the wall 370 (which will be described later) partitioning an ink containing chamber 340 in the ink container 30 is visible from the outside. In the use state shown in FIG. 2A, the third side surface 372C is orthogonal to a horizontal arrangement surface (the horizontal being parallel to an X-Y plane). On the other hand, in the pouring state shown in FIG. 2B, the third side surface 372C is parallel to the arrangement surface. That is, in the pouring state, the third side surface 372C configures the bottom surface of the ink container 30 (ink chamber 340).

As shown in FIG. 2A, the third side surface 372C is provided with a first state identification portion LB1 (also referred to as a "refill start identification portion LB1"). The first state identification portion LB1 is used to allow the user to identify a first state in the use state in which the ink container 30 should be filled with ink in the use state. Specifically, the first state identification portion LB1 is provided to identify that the ink in the ink container is consumed and the liquid surface of the ink in the ink container reaches a first height in the use state. The first state identification portion LB1 includes straight line LM1, which is a horizontal (parallel to the X-Y plane) in the use state (also referred to as a "first state display line LM1" or "refill start display line LM1") in the use state. When the liquid surface of the ink reaches the vicinity of the first state display line LM1, the user refills the ink container 30 (ink chamber 340) with ink.

In the pouring state shown in FIG. 2B, when the user opens the top case 54, an upper surface 371 (which will be described later) of the wall 370 (which will be described later) partitioning the ink containing chamber 340, different from the third side surface 372C, is visible from the outside.

The upper surface 371 is a wall that is orthogonal to the arrangement surface parallel to the X-Y plane in the pouring state. On the other hand, the upper surface 371 configures the upper surface of the ink chamber 340 in the use state shown in FIG. 2A.

The upper surface 371 is provided with a second state identification portion LB2 (also referred to as a "refill completion identification portion LB2"). The second state identification portion LB2 is used to allow the user to identify a second state in which ink pouring into the ink container 30 is completed during the pouring state. Specifically, the second state identification portion LB2 is provided to identify that the ink container is refilled with ink and the liquid surface of the ink inside reaches a second height in the pouring state. The second state identification portion LB2 includes a horizontal straight line LM2 (also referred to as a "second state display line LM2" or "refill completion display line LM2") in the pouring state. When the liquid surface of the ink reaches the vicinity of the second state display line LM2, the user stops refilling the ink container 30 (ink chamber 340) with ink.

In the embodiment, the posture of the ink container 30 is different in the use state and the pouring state as shown in FIGS. 2A and 2B, but the invention is not limited thereto. For example, the posture of the ink container 30 may be the same in the use state and the pouring state. Therefore, the generation of aggregates due to ink can be further suppressed. That is, when the posture of the ink container 30 is changed in the use state and the pouring state, the ink in the ink chamber 340 is attached to a portion with which the ink is not in contact up to that point (for example, a part of the wall 370 partitioning the ink chamber 340, or a part of the support 380 which will be described later) in some cases. When the ink attached to the portion is in contact with the atmosphere to form a gas-liquid interface, aggregates are generated. Contrarily, when the posture of the ink container 30 is not changed in the use state and the pouring state, attachment of new ink to a portion with which the ink is not in contact up to that point can be reduced, and thus, there is a tendency that the generation of aggregates in the ink chamber 340 can be suppressed.

When the posture of the ink container 30 is the same in the use state and the pouring state, for example, the posture of the ink container 30 shown in FIG. 2A may be set as the use state and the pouring state. In this case, the ink pouring port 304 may be provided at a position from which the ink does not leak out in the pouring state, and for example, when the ink pouring port 304 that is opened upward in the vertical direction is provided above the ink container 30 (for example, the upper surface 371 of the wall 370 which will be described later), the ink can be prevented from leaking out at the time of pouring.

Circulation Path of Ink and Air

Figure 3:
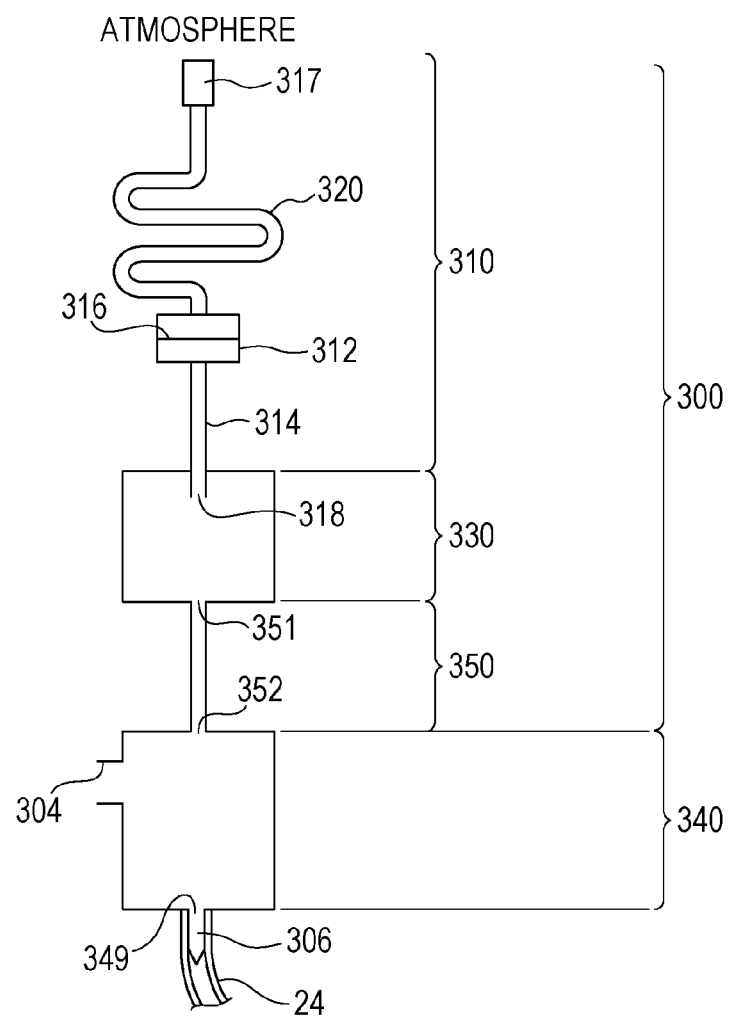
FIG. 3 is a concept view showing a path from an atmosphere opening port to an ink lead-out portion in the ink jet recording apparatus according to the embodiment of the invention.

Next, an ink supply path in the ink jet recording apparatus 1 according to the embodiment will be described. FIG. 3 is a concept view showing a path from an atmosphere opening port 317 to an ink lead-out portion 306.

The path (flow path) from the atmosphere opening port 317 to the ink lead-out portion 306 is roughly divided into an atmosphere open flow path 300 and the ink chamber 340. The atmosphere open flow path 300 is configured with a first flow path 310, an air chamber 330, and an ink chamber communication path 350 serving as a second flow path sequentially from the upstream side. In the atmosphere open flow path 300, an air introduction port 352 serving as an end is opened to the ink chamber 340, and the atmosphere opening port 317 serving as the other end is opened to the outside. That is, the atmosphere opening port 317 communicates with the atmosphere. In the use state, a liquid surface that is in direct contact with the atmosphere is formed in the ink chamber communication path 350 (specifically, in the vicinity of the air introduction port 352), air (bubbles) is introduced into the ink in the ink chamber 340 from the air introduction port 352, and thus, air is introduced into the ink chamber 340.

The first flow path 310 makes the air chamber 330 communicate with the outside in such a manner that an atmosphere introduction port 318 (also referred to as an "air chamber opening 318") serving as an end is opened to the air chamber 330, and the atmosphere opening port 317 serving as the other end is opened to the outside. The first flow path 310 includes a communication flow path 320, a gas-liquid separating chamber 312, and a communication flow path 314. One end of the communication flow path 320 is connected to the atmosphere opening port 317 and the other end thereof is connected to the gas-liquid separating chamber 312. A part of the communication flow path 320 is a long narrow flow path and suppresses the evaporation of moisture in the ink stored in the ink chamber 340 from evaporating from the atmosphere open flow path 300 to the outside due to scattering. A sheet member (film member) 316 is arranged between the upstream and the downstream of the gas-liquid separating chamber 312 so as to close the flow path. The sheet member 316 has a gas permeable and liquid impermeable property. As the sheet member 316, for example, Gore-Tex (registered trademark) or the like can be used. When the sheet member 316 is arranged so as to close the middle of the path (flow path) from the atmosphere introduction port 318 to the atmosphere opening port 317, the inflow of the ink reversely flowing from the ink chamber 340 into the upstream of the sheet member 316 is suppressed. The sheet member 316 has a function as a gas-liquid separating film.

The communication flow path 314 makes the gas-liquid separating chamber 312 communicate with the air chamber 330. One end of the communication flow path 314 is the atmosphere introduction port 318. The air chamber 330 has a predetermined volume in which the flow path cross-sectional area is larger than the flow path cross-sectional area of the ink chamber communication path 350. Accordingly, the ink reversely flowing from the ink chamber 340 is stored and the inflow of the ink into the upstream side of the air chamber 330 is suppressed.

The ink chamber communication path 350 makes the air chamber 330 communicate with the ink chamber 340 in such a manner that an air chamber side opening 351 serving as one end is opened in the air chamber 330, and the air introduction port 352 serving as the other end is opened in the ink chamber 340. The flow path cross-sectional area of the ink chamber communication path 350 is preferably small enough such that a meniscus (liquid surface crosslinking) can be formed.

The ink chamber 340 contains ink and the ink is circulated from an ink outlet 349 of the ink lead-out portion 306 to the subtank 20 (refer to FIGS. 1A and 1B) through the ink supply tube 24.

Next, a principle of supplying the ink from the ink container 30 to the subtank 20 (recording head 17) will be described using FIG. 4. FIG. 4 is a view schematically showing a part of the inner structure of the ink jet recording apparatus 1. The ink container 30 of the embodiment supplies the ink to the recording unit 12 utilizing the principle of the Mariotte's bottle.

In the example of FIG. 4, the ink jet recording apparatus 1 is arranged on a horizontal surface sf (X-Y plane). The ink lead-out portion 306 of the ink container 30 and an ink receiving portion 202 of the subtank 20 are connected through the ink supply tube 24.

In the example of FIG. 4, the subtank 20 includes an ink storage chamber 204, an ink flowing path 208, and a filter 206. Into the ink flowing path 208, an ink supply needle 16a of the carriage 16 is inserted. When aggregates are mixed in the ink, the filter 206 prevents the inflow of the aggregates into the recording head 17 by capturing the aggregates. The ink of the ink storage chamber 204 flows through the ink flowing path 208 and the ink supply needle 16a by the suction from the recording head 17, and is then supplied to the recording head 17. The ink supplied to the recording head 17 is discharged to the outside (a recording medium) through nozzles (not shown).

After the ink is poured from the ink pouring port 304 to the ink chamber 340 in the pouring state (refer to FIG. 2B), in a case where the ink pouring port 304 is sealed with the plug member 302 and set in a use state, air in the ink chamber 340 expands and the ink chamber 340 has a negative pressure. Further, the pressure of the ink chamber 340 maintains the negative pressure by the suction of the ink in the ink chamber 340 from the recording head 17.

The air introduction port 352 is positioned on the side lower than the position of the first state display line LM1 in the use state. In the example of FIG. 4, the air introduction port 352 is formed on the bottom surface 373 of the wall 370 partitioning the ink chamber 340 in the ink chamber 340 in the use state. In this manner, even when the ink in the ink chamber 340 is consumed and the liquid surface of the ink chamber 340 is lowered, a liquid surface (atmosphere contact surface) LA in direct contact with the atmosphere is maintained at a fixed height over a long period of time (time in which the liquid surface of the ink reaches the first state display line LM1). In the use state, the air introduction port 352 is arranged to be lower than the recording head 17. Thus, a hydraulic head difference d1 arises. In the use state, the hydraulic head difference d1 in a state where the atmosphere contact liquid surface LA which is a meniscus is formed near the air introduction port 352 of the ink chamber communication path 350 is also referred to as a "stationary hydraulic head difference d1".

Due to the fact that the ink in the ink storage chamber 204 is sucked in by the recording head 17, the pressure of the ink storage chamber 204 reaches a predetermined negative pressure or higher. When the pressure of the ink storage chamber 204 reaches a predetermined negative pressure or higher, the ink in the ink chamber 340 is supplied to the ink storage chamber 204 through the ink supply tube 24. That is, the ink storage chamber 204 is automatically refilled with the amount of the ink equivalent to the amount of the ink flowing to the recording head 17 from the ink chamber 340. In other words, the ink is supplied from the ink chamber 340 to the ink storage chamber 204 due to the fact that the suction force (negative pressure) from the recording unit 12 becomes larger by a certain amount than the hydraulic head difference d1 caused by a height difference in the vertical direction between the atmosphere contact liquid surface LA and the recording head 17 (specifically, nozzles).

When the ink in the ink chamber 340 is consumed, the air of the air chamber 330 is introduced into the ink chamber 340 as bubbles G through the ink chamber communication path 350. Thus, the liquid surface LF (liquid surface LF of the ink) of the ink chamber 340 is lowered. On the other hand, since the atmosphere contact liquid surface LA in direct contact with the atmosphere is maintained at a fixed height, the hydraulic head difference d1 is maintained at a fixed difference. That is, by the predetermined suction force of the recording head 17, the ink can be stably supplied to the recording head 17 from the ink container 30.

As shown in a partially enlarged view of the ink chamber 340 of FIG. 4, at the boundary portion A in which the liquid surface LF of the ink and the inner side of the wall 370 partitioning the ink chamber 340 are in contact with each other, a thin ink film is easily formed. The thin ink film formed at the boundary portion A easily dries, and thus, when being peeled off from the surface of the wall, the thin ink film causes the generation of aggregates. Similarly, the ink attached to the support 380 (which will be described later) easily forms a thin film, which causes the generation of aggregates.

Structure of Ink Container

Figure 5:
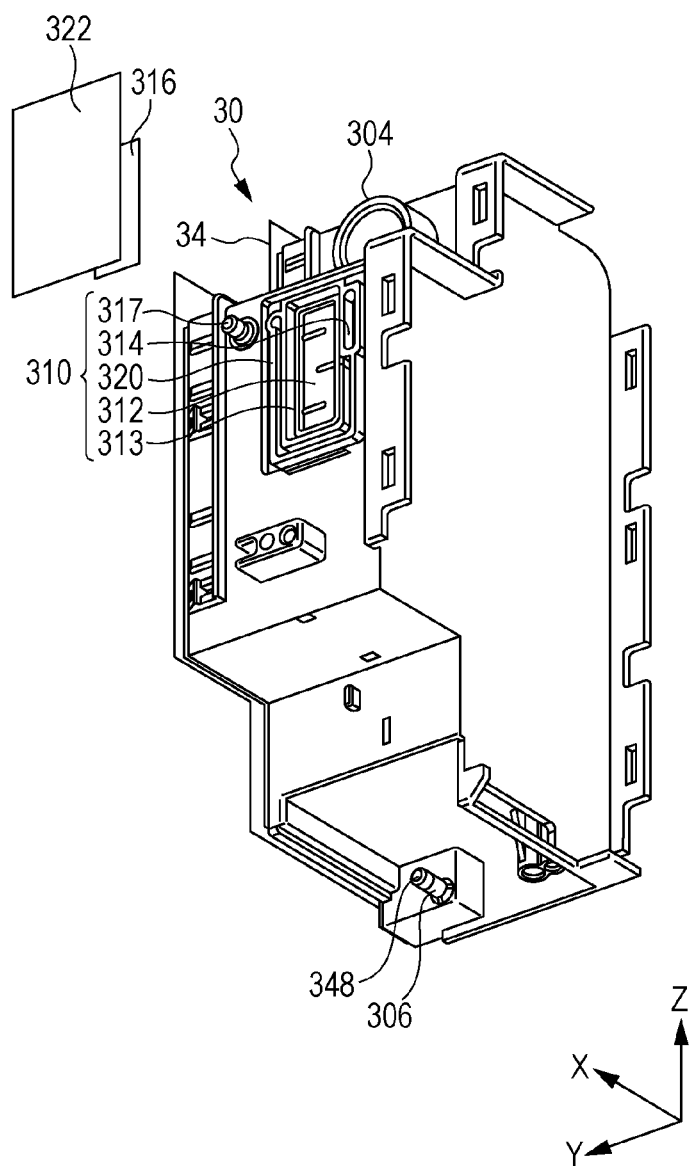
FIG. 5 is an external perspective view schematically showing an ink container according to an embodiment of the invention.

FIG. 5 is an external perspective view schematically showing an example of an ink container according to the invention. Specifically, FIG. 5 shows a state before film members 316 and 322 are attached to the ink container 30.

In the example of FIG. 5, the ink container 30 has an approximately columnar shape (specifically, approximately right-angled columnar shape), and the shape thereof is not limited thereto and the ink container may have any shape. The ink container 30 is formed of a plastic plate mainly made of synthetic resin (polypropylene or the like) and a part thereof may be made of a flexible member (a film formed by using materials, such as polyolefin (for example, polyethylene, and polypropylene), polyamide, polyester (for example, polyethylene terephthalate), vinyl copolymers (for example, vinyl acetate, and vinyl chloride), and metal or metal oxides (for example, aluminum, and alumina), singly or in combination). Specifically, the ink container 30 in FIG. 5 is formed such that a film 34 is attached to one surface of a molded plastic container of synthetic resin. In addition, it is preferable that at least a part of the ink container 30 be transparent or translucent. Thus, the ink state (ink level or the like) of the ink container 30 can be checked.

Since a wetting agent such as a surfactant is included in the ink composition which is normally used, there is a tendency that the wettability of the ink composition to the member constituting the inner side of the wall partitioning the ink chamber is high. Therefore, a thin film of the ink composition is easily formed on the inner side of the wall 370, and the formed thin film may cause the generation of aggregates in some cases. In order to suppress the generation of such a thin film, as the member constituting the inner side of the wall 370, a material having high liquid repellency to the ink composition is preferably used. Particularly, when fluorine compounds, silicone resins, polypropylene, polystyrene, polyethylene, polyester, polyvinyl chloride, phenol resins, polyvinyl acetate, and poly(meth)acrylic ester (for example, polymethyl(meth)acrylate) and the like are used, the aforementioned static contact angle CA is easily set to 10° or more. These materials can be used singly or in combination of two or more. Among the materials, from the viewpoint that the aforementioned static contact angle CA is more easily set to 10° or more, it is more preferable to use ink repellent materials such as fluorine compounds, or silicone resins.

In the invention, the expression "poly(meth)acrylic ester" indicates both polyacrylic ester and polymethacrylic ester, and the expression "polymethyl(meth)acrylate" indicates both polymethyl acrylate and polymethyl methacrylate.

Examples of fluorine compounds include organic compounds having fluorine atoms and fluorine resins. Examples of organic compounds having fluorine atoms to be used include fluoroalkylsilane, alkane having a fluoroalkyl group, carboxylic acid having a fluoroalkyl group, alcohol having a fluoroalkyl group, and amine having a fluoroalkyl group. Examples of fluoroalkylsilane include heptadecafluoro-1,1,2,2-tetrahydrodecyltrimethoxysilane or heptadecafluoro-1,1,2,2-tetrahydrotrichlorosilane. Examples of alkane having a fluoroalkyl group include octafluorocyclobutane, perfluoromethylcyclohexane, perfluoro-n-hexane, perfluoro-n-heptane, tetradecafluoro-2-methylpenthane, perfluorododecane, and perfluoroeicosane. Examples of carboxylic acid having a fluoroalkyl group include perfluorodecanoic acid and perfluorooctane acid. Examples of alcohol having a fluoroalkyl group include 3,3,4,4,5,5,5-heptafluoro-2-pentanol. Examples of amine having a fluoroalkyl group include heptadecafluoro-1,1,2,2-tetrahydrodecylamine. Examples of fluorine resins include a tetrafluoroethylene-perfluoroalkyl vinyl ether copolymer (PFA), a tetrafluoroethylene-hexafluoropropylene copolymer (FEP), a tetrafluoroethylene-ethylene (ETFE) copolymer, polychlorotrifluoroethylene (PCTFE), an ethylene-chlorotrifluoroethylene (ECTFE) copolymer, and polytetrafluoroethylene (PTFE).

As silicone resins, there are polymers having a siloxane structure unit substituted with an organic group such as an alkyl group, and examples of the resins to be used include polymers having a dimethylsiloxane skeleton such as $\alpha,\omega$-bis(3-aminopropyl)polydimethylsiloxane, $\alpha,\omega$-bis(3-glycidoxypropyl)polydimethylsiloxane, and $\alpha,\omega$-bis(vinyl)polydimethylsiloxane.

A liquid repellent layer may be provided on the inner side of the wall 370 partitioning the ink chamber 340. For example, the liquid repellent layer is formed by applying a liquid repelling agent (for example, the aforementioned fluorine compounds or silicone resins) or the like. When the liquid repellent layer is provided on the inner side of the wall 370, the member constituting the inner side of the wall 370 refers to the liquid repellent layer. As the liquid repelling agent, commercially-available products can be used and examples thereof include HC 303 VP (product name, manufactured by WACKER ASAHIKASEI SILICONE CO., LTD., silicone resin), and SFCOAT (product name, manufactured by AGC SEIMI CHEMICAL CO., LTD., fluorine compound).

On the surface of the member constituting the inner side of the wall 370 partitioning the ink chamber 340, a fine periodic structure may be provided. For example, the fine periodic structure can be formed by a method of producing a resin molding disclosed in JP-A-2012-66417. For example, in the fine periodic structure, pyramids (such as a triangular pyramid, a quadrangular pyramid, or a hexagonal pyramid) are continuously provided and a distance between the apexes of adjacent pyramids is about 1.0 μm to 100 μm. Thus, the liquid repellency between the member constituting the inner side of the wall 370 and the ink composition can be improved.

The centerline average roughness (Ra) of the inner side of the wall 370 is preferably 0.1 μm or more and 10 μm or less. Accordingly, the liquid repellency on the inner side of the wall 370 is further improved. It can be considered that the reason why the liquid repellency is improved as described above is that plural fine unevennesses are formed on the surface of the inner wall. The centerline average roughness (Ra) can be measured using an optical three-dimensional surface roughness measuring machine RST plus (manufactured by WYKO Corporation). Specifically, five points are measured using an objective lens of ×40 and an intermediate lens of ×1.0 and at a field of view of 111×150 μm and the average value thereof is set to a centerline average roughness (Ra).

In the use state, a first flow path 310 is formed on the side wall configuring the side surface of the ink container 30. The first flow path 310 includes the atmosphere opening port 317, the communication flow path 320, the film member 316, the gas-liquid separating chamber 312, and the communication flow path 314. The gas-liquid separating chamber 312 has a concave shape and has an opening on the bottom surface of the concave shape. The gas-liquid separating chamber 312 and the communication flow path 314 communicate with each other through the opening of the bottom surface. The distal end of the communication flow path 314 is the atmosphere introduction port 318 (refer to FIG. 3). A bank 313 is formed at the entire periphery of the inner wall which surrounds the bottom of the gas-liquid separating chamber 312. The film member 316 is attached to the bank 313. The film member 322 is attached to the ink container 30 so as to cover the flow path of the first flow path 310, which is formed on the outer surface of the ink container 30. In this manner, the communication flow path 320 is formed and leakage of the ink in the ink container 30 to the outside is prevented. A part of the communication flow path 320 is formed along the outer periphery of the gas-liquid separating chamber 312 in order to make a distance between the atmosphere opening port 317 and the gas-liquid separating chamber 312 long. Thus, evaporation of moisture in the ink in the ink container 30 from the atmosphere introduction port 318 to the outside can be suppressed.

Air that flows in the first flow path 310 passes through the film member 316 attached to the bank 313 and serving as a gas-liquid separating film on the way. Thus, leakage of ink which is contained in the ink container 30 to the outside can be suppressed.

The ink lead-out portion 306 has a cylindrical shape and has a flow path therein. The ink supply tube 24 is connected to the ink lead-out portion 306. In addition, an other end 348 of the ink lead-out portion 306 is opened to the outside.

Figure 6:
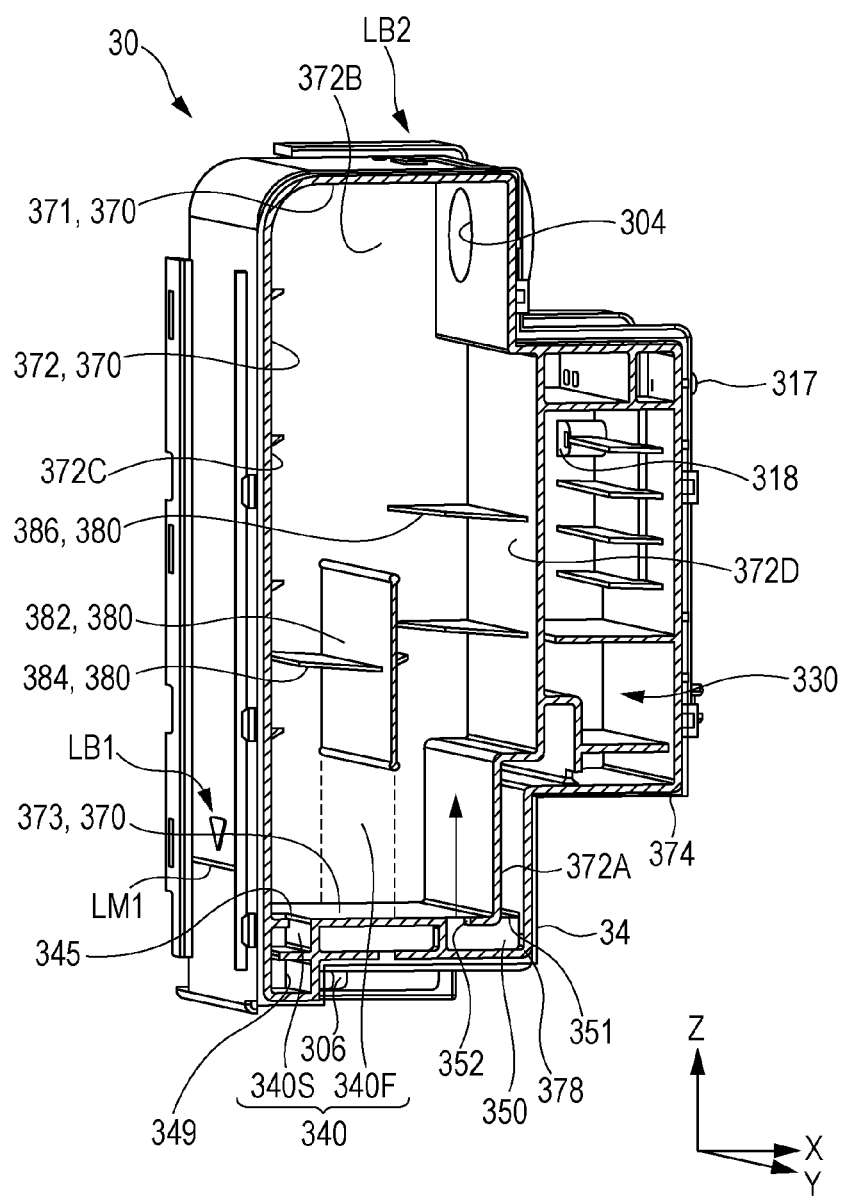
FIG. 6 is a perspective view schematically showing the inner structure of the ink container according to the embodiment of the invention in a use state.
Figure 7:
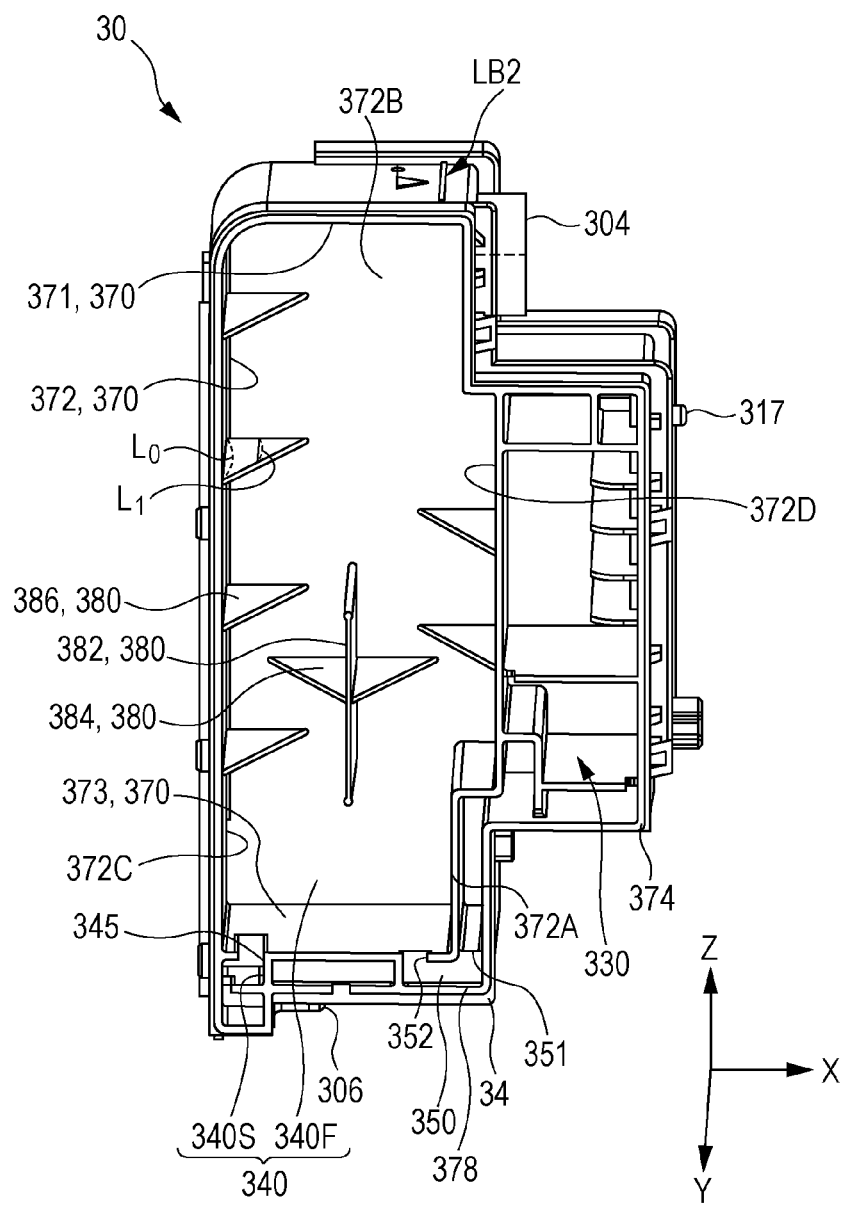
FIG. 7 is a perspective view schematically showing the inner structure of the ink container according to the embodiment of the invention in a use state.
Figure 8:
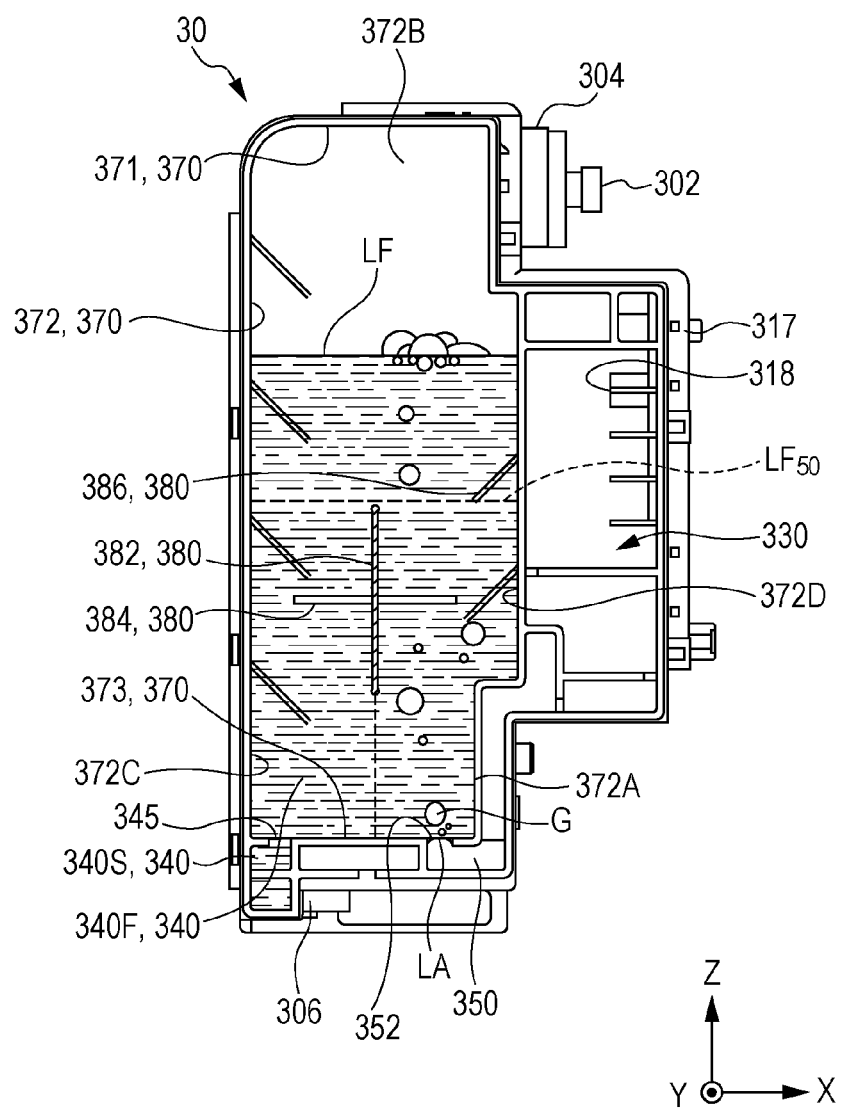
FIG. 8 is a side view schematically showing the inner structure of the ink container according to the embodiment of the invention in a use state.

Next, the inner structure of the ink container will be described with reference to the drawings. FIGS. 6 and 7 are perspective views schematically showing the inner structure of the ink container 30 in the use state. FIG. 8 is a side view schematically showing the inner structure of the ink container 30 in the use state. More specifically, FIG. 8 is a view when the ink container 30 is viewed in the minus direction of the Y-axis, and a first side surface 372A (which will be described later) made of a film is positioned at the front.

In the examples of FIGS. 6 and 7, the ink container 30 has a concave shape in which one side surface is opened and the opening is closed by the film 34 such that plural spaces (chambers) partitioned in the ink container are formed. More specifically, the air chamber 330, the ink chamber 340, and the ink chamber communication path 350 are formed in the ink container 30. That is, members (such as walls, and the film 34) configuring the ink container 30 function as the wall 370 partitioning the ink chamber 340, a wall 374 partitioning the air chamber 330, and a wall 378 partitioning the ink chamber communication path 350. In FIG. 6, hatching is imparted to the portion to which the film 34 is attached.

The ink chamber 340 communicates with the ink pouring port 304 through which the ink chamber can be refilled with ink. The ink pouring port 304 is closed with the plug member 302 in the use state to suppress leakage of the ink or an inflow of air into the ink chamber 340.

As shown in FIGS. 6 to 8, the ink chamber 340 is partitioned by the wall 370, and when the ink is poured into the ink chamber 340, the inner side of the wall 370 is in contact with the ink.

In the examples of FIGS. 6 and 7, the wall 370 partitioning the ink chamber 340 is configured by a upper surface 371, a side surface 372, and a bottom surface 373. Here, the upper surface 371 of the wall 370 refers to a surface that can be seen when the ink chamber 340 is viewed upwardly from the inside thereof in the vertical direction in the use state. The side surface 372 of the wall 370 refers to a surface that can be seen when the ink chamber 340 is viewed from the inside thereof in the horizontal direction in the use state. The bottom surface 373 of the wall 370 refers to a surface that can be seen when the ink chamber 340 is viewed downwardly from the inside thereof in the vertical direction in the use state.

More specifically, in the examples of FIGS. 6 and 7, the side surface 372 is formed of a first side surface 372A, a second side surface 372B that is opposite to the first side surface 372A, a third side surface 372C that is connected to the first side surface 372A, and a fourth side surface 372D that is opposite to the third side surface 372C.

Here, the first side surface 372A is made of the film 34. The upper surface 371, the second side surface 372B, the third side surface 372C, the fourth side surface 372D, and the bottom surface 373 are made of a material other than the film.

In the examples of FIGS. 6 and 7, the ink chamber 340 includes a first chamber 340F and a second chamber 340S, and the first chamber 340F is arranged on the upper side of the second chamber 340S. The first chamber 340F and the second chamber 340S are arranged in parallel and communicate with each other through an inner communication port 345. The volume of the first chamber 340F is larger than that of the second chamber 340S and functions as the main chamber of the ink chamber 340.

The ink pouring port 304 and the air introduction port 352 are provided in the first chamber 340F, and the ink outlet 349 serving as one end of the ink lead-out portion 306 is provided the in the second chamber 340S. In the use state, the ink outlet 349 is positioned on the lower side of the air introduction port 352. The air introduction port 352 and the inner communication port 345 are respectively provided at different positions on the bottom surface (a part of the bottom surface 373) of the first chamber 340F. The ink outlet 349 is provided on the side surface of the second chamber 340S (a part of the fourth side surface 372D).

A filter (not shown) may be provided in the ink container 30 to capture aggregates generated in the ink chamber 340, foreign substances mixed in the ink at the time of ink pouring, or the like. For example, the filter can be provided at the ink outlet 349 and the ink lead-out portion 306 in the ink container 30. Since a continuous supply type ink container like the ink container 30 according to the embodiment, which can be refilled with ink, has a significantly large gas-liquid interface area and a significantly large number of contact portions between the inner side of the wall and the liquid surface of the ink, and has a very long period of use, compared to an ink container which is replaceable instead of ink refill (so-called ink cartridge), aggregates are easily generated in large amounts or frequently, and inconveniences such as ink supply failure from the aggregates captured by the filter or the like tends to become apparent easily. Even in such a case, since aggregates caused by the ink attached to the boundary portion A in which the inner side of the wall 370 and the liquid surface LF of the ink are in contact with each other and the support 380 in the ink container 30 according to the embodiment as described above are not easily generated, the clogging of the filter provided in the ink container 30 and the filter provided in the ink flow path in the ink jet recording apparatus can be reduced.

The ink chamber 340 includes the support 380 which is connected to the inner side of the wall 370 and supports the wall 370. The support 380 has a function of improving the strength or rigidity of the wall 370, or improving the adhesion of the film 34 serving as a part of the wall 370 (first side surface 372A), and is referred to as a "rib" in some cases.

As the member constituting the support 380, the materials for the member constituting the ink container 30 and the inner side of the wall 370 can be used. Among the aforementioned materials, from the viewpoint of satisfactory liquid repellency to the ink composition, the materials for the member constituting the inner side of the wall 370 can be preferably used. A liquid repellent layer and fine periodic structure may be provided on the surface of the support 380 as described in the description of the member constituting the inner side of wall 370. When a liquid repellent layer is provided on the surface of the support 380, the member constituting the support 380 refers to the liquid repellent layer.

Here, in the use state of the ink container 30, when the ink chamber 340 is filled with the ink at 50% of the volume, it is preferable that the area (R1) of the support 380 in contact with the ink be larger than the area (R2) of the support in contact with the atmosphere (air) (that is, it is preferable that the relationship of R1>R2 be satisfied). When such a relationship is satisfied, there is little chance in the ink attached to the support 380 being in contact with the atmosphere at the consumption of the ink in the ink chamber 340, and thus, drying of the ink attached to the support 380 can be suppressed. Therefore, the generation of aggregates caused by the ink attached to the support 380 is suppressed, and thus, the clogging of the recording head 17 can be suppressed. The ink container 30 which satisfies such a relationship will be described using FIG. 8.

$LF_{50}$ in FIG. 8 refers to the position of the liquid surface of the ink when the ink chamber 340 is filled with the ink up to 50% of the volume. In the ink container 30 in FIG. 8, the relationship of R1>R2 is satisfied such that the number of supports 380 positioned above $LF_{50}$ is decreased to be less than the number of supports 380 positioned at $LF_{50}$ or lower. Thus, the generation of aggregates caused by the ink attached to the support 380 can be suppressed.

As shown in FIGS. 6 to 8, the support 380 may include a first support 382, a second support 384, and a third support 386. In addition, these supports may be provided in plural respectively.

In the examples of FIGS. 6 and 7, the first support 382 is connected to the inner side of the first side surface 372A, and the inner side of the second side surface 372B. The first support 382 is mainly used to improve the adhesion of the first side surface 372A (film 34) to the ink container 30. The first support 382 may be connected to any position of the upper surface 371, the side surface 372, and the bottom surface 373 as long as the adhesion of the first side surface 372A can be improved.

In the examples of FIGS. 6 and 7, the second support 384 is connected to the first support 382, and the inner side of the second side surface 372B. The second support 384 is mainly used to support the first support 382. The second support 384 may be connected to any position of the upper surface 371, the side surface 372, and the bottom surface 373 and may be connected to two or more surfaces as long as the first support 382 can be supported.

In the examples of FIGS. 6 and 7, the third support 386 is formed of a support which is connected to the inner side of the second side surface 372B and the inner side of the third side surface 372C, and a support which is connected to the inner side of the second side surface 372B and the inner side of the fourth side surface 372D. The third support 386 is mainly used to improve the strength of the portion to which each surface is connected. The third support 386 may be connected to any position of the upper surface 371, the side surface 372, and the bottom surface 373 and may be connected to two or more surfaces as long as the strength of the connection portion of each surface can be improved.

When the ink chamber 340 is filled with the ink at 50% of the volume in the use state, it is preferable that the ink container 30 have a support not in contact with the ink. That is, as shown in FIG. 8, supports are present at a position above $LF_{50}$ (the position of the liquid surface of the ink when the ink chamber 340 is filled with the ink at 50% of the volume) and a position of $LF_{50}$ or lower. In this manner, when the supports are present at both positions above and below $LF_{50}$, the strength of the ink container 30 can be improved.

It is preferable that the plural supports 380 be provided in a direction intersecting the vertical direction of the ink container 30. That is, in the examples of FIGS. 6 to 8, plural supports 380 of the first support 382, the second support 384, and the third support 386 are provided in a direction (X-axis direction) intersecting the vertical direction (Z-axis). Thus, the strength of the ink container can be improved. Particularly, when plural first supports 382 are provided in the direction intersecting the vertical direction of the ink container 30 (refer to FIGS. 10 and 11 described later), the adhesion strength of the first side surface 372A (film 34) is further improved, and thus, the configuration is preferable.

Figure 10:
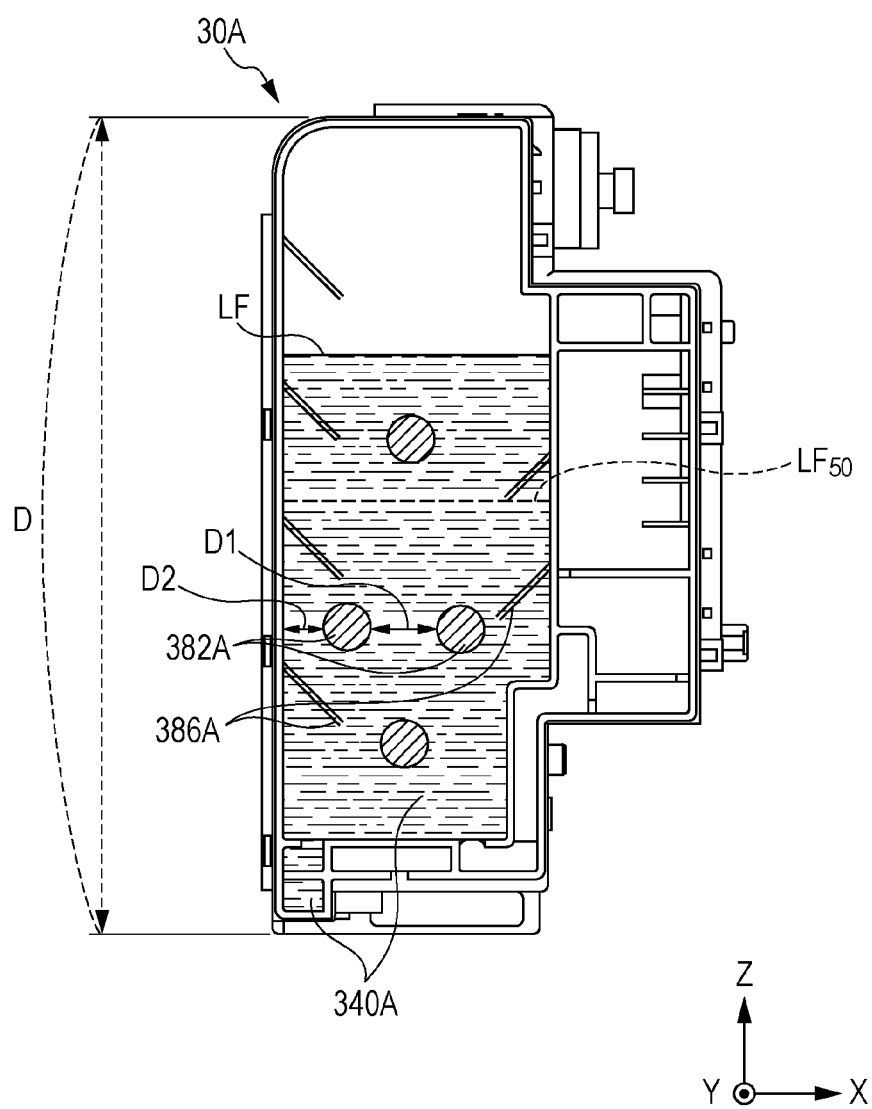
FIG. 10 is a view schematically showing the inner structure of an ink container according to an embodiment of the invention in a use state.
Figure 11:
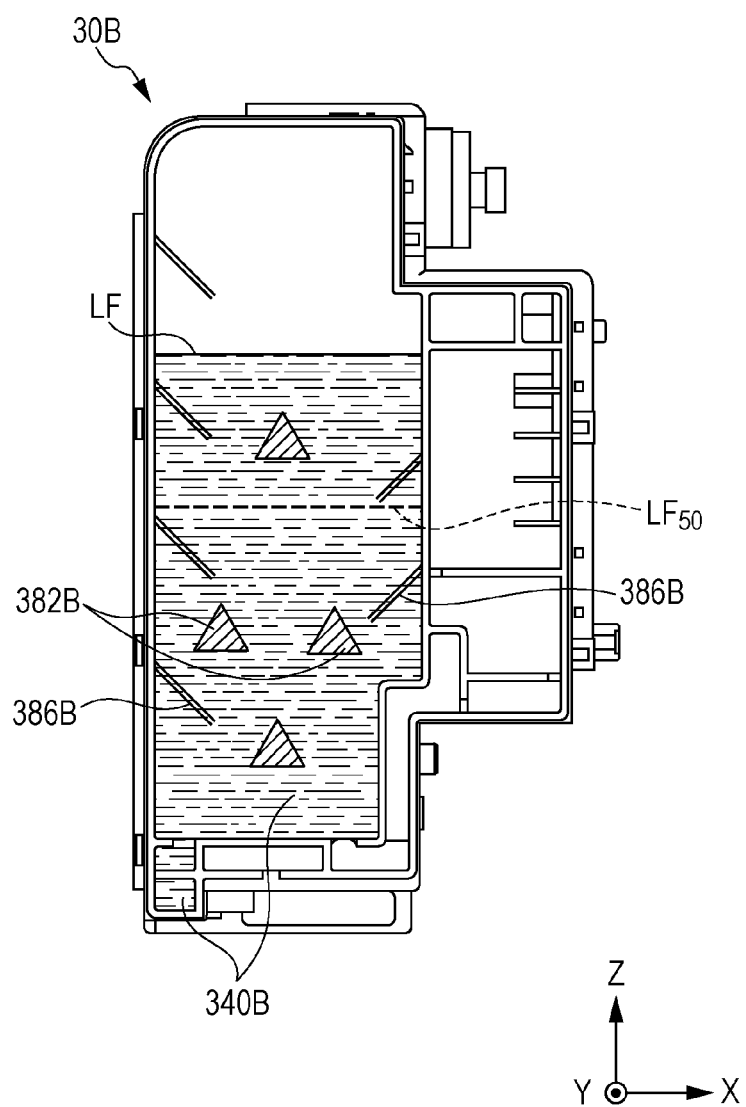
FIG. 11 is a view schematically showing the inner structure of an ink container according to an embodiment of the invention in a use state.

When the ink in the ink chamber is consumed, the ink remains on the support, and aggregates are generated from the gas-liquid interface of the ink remaining on the support in some cases. Thus, it is preferable that a support on which the ink hardly remains when the liquid surface of the ink has passed the support be used. Thus, it is preferable that the upper surface of each support 380 starts downward. Specifically, due to the fact that the upper surface of the support in the use state has an upward convex shape in the vertical direction (that is, an upwardly curved or bent shape in the vertical direction or a downwardly slanting shape), and the support which does not have a horizontal surface is used, the ink attached to the support easily comes away. The upper surface of the support refers to a surface that can be seen when the support is viewed downwardly from the inside of the ink chamber in the vertical direction in the use state. Specific examples of first supports 382A and 382B having such a shape are shown in FIGS. 10 and 11.

It is preferable that the surface area of the second support 384 is reduced while the contact area with the wall surface is secured from the viewpoint of reducing the generation of aggregates caused by the ink attached to the support while the strength of the ink container 30 is maintained. That is, as the second support 384, it is preferable to use a support in which a surface shown when the second support 384 is viewed downwardly in the vertical direction has a side that is connected to the second side surface 372B in the use state of the ink container 30 and the length of a line segment parallel to the side in the surface is shorter than the length of the side. As the second support 384, it is more preferable to use a support in which a surface shown when the second support 384 is viewed downwardly in the vertical direction has a side that directly connects the second side surface 372B and the first support 382 in the use state of the ink container 30. A specific example of the second support having such a shape is shown in FIG. 9A.

Figure 9A:
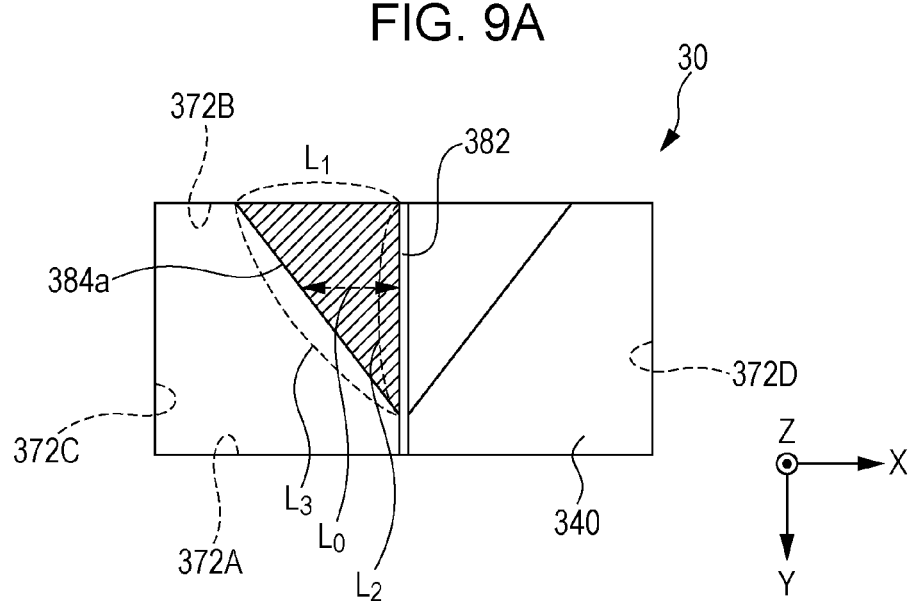
FIGS. 9A and 9B are top views schematically showing a part of the inner structure of the ink container according to the embodiment of the invention in a use state.

FIG. 9A is a view schematically showing the shape of the second support 384 when the ink chamber 340 in FIG. 7 is viewed downwardly in the Z-axis direction (downwardly in the vertical direction). As shown in FIG. 9A, a surface 384a (a hatched line portion) shown when the second support 384 is viewed downwardly in the vertical direction has a side $L_1$ connected to the second side surface 372B and the length of a line segment (for example, a side $L_0$) parallel to the side $L_1$ in the surface 384a is shorter than the length of the side $L_1$. More specifically, the surface 384a is a triangle including the side $L_1$ connected to the second side surface 372B, a side $L_2$ connected to the first support 382, and a side $L_3$ connected to the second side surface 372B and the first support 382. Thus, the generation of aggregates caused by the ink attached to the second support 384 can be suppressed by reducing the contact area between the ink and the ink container 30 while the strength of the ink container 30 is maintained.

It is preferable that the surface area of the third support 386 is reduced while the contact area with the wall surface is secured from the viewpoint of reducing the generation of aggregates caused by the ink attached to the support while the strength of the ink container 30 is maintained, similar to the second support 384. That is, as the third support 386, it is preferable to use a support in which a surface shown when the third support 386 is viewed downwardly in the vertical direction has a side that is connected to the second side surface 372B in the use state of the ink container 30 and the length of a line segment parallel to the side in the surface is shorter than the length of the side. As the third support 386, it is more preferable to use a support in which a surface shown when the third support 386 is viewed downwardly in the vertical direction has a side that directly connects at least two surfaces configuring the wall 370 partitioning the ink containing chamber 340 in the use state of the ink container 30. A specific example of the third support having such a shape is shown in FIG. 9B.

Figure 9B:
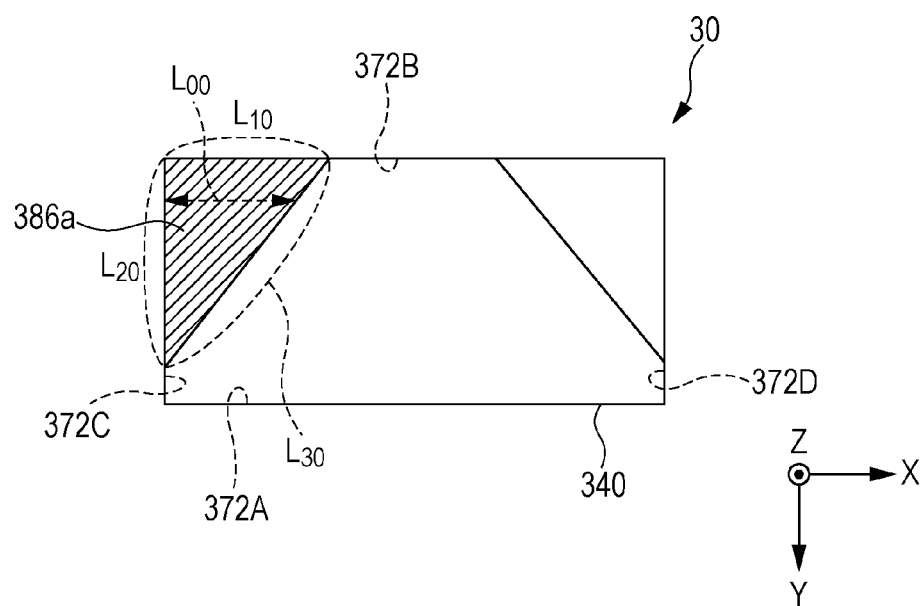

FIG. 9B is a view schematically showing the shape of the third support 386 when the ink chamber 340 in FIG. 7 is viewed downwardly in the Z-axis direction (downwardly in the vertical direction). As shown in FIG. 9B, a surface 386a (a hatched line portion) shown when the third support 386 is viewed downwardly in the vertical direction has a side $L_{10}$ connected to the second side surface 372B and the length of a line segment (for example, a side $L_{00}$) parallel to the side $L_{10}$ in the surface 386a is shorter than the length of the side $L_{10}$. More specifically, the surface 386a is a triangle including the side $L_{10}$ connected to the second side surface 372B, a side $L_{20}$ connected to the third side surface 372C, and a side $L_{30}$ connected to the second side surface 372B and the third side surface 372C. Thus, the generation of aggregates caused by the ink attached to the third support 386 can be suppressed while the strength of the ink container 30 is maintained.

The examples of FIGS. 10 and 11 are specific examples in which the upper surface of the support has an upward convex shape in the vertical direction and the support does not have a horizontal upper surface in a use state.

FIG. 10 is a view schematically showing the inner structure of an ink container in the use state. The components of an ink container 30A in FIG. 10 are the same as the components of the ink container 30 in FIG. 8 except a support 380A provided in an ink chamber 340A, and thus, a repeated description of common portions is omitted.

The support 380A in FIG. 10 includes a first support 382A and a third support 386A, and the first support 382A and the third support 386A correspond to the first support 382 and the third support 386 in FIG. 8, respectively. The first support 382A has a cylindrical shape extending in the Y-axis direction. While the third support 386A has the same shape as the third support 386 in FIG. 8, the arrangement angle is different. That is, while the upper surface of the third support 386 in FIG. 8 is parallel to the horizontal surface, the upper surface of the third support 386A in FIG. 10 is arranged to face downwardly. In this manner, the upper surface of the support 380A in FIG. 10 has an upward convex shape in the vertical direction and the support does not have a horizontal surface, and thus, the generation of aggregates can be effectively suppressed.

FIG. 11 is a view schematically showing the inner structure of an ink container in a use state. The components of an ink container 30B in FIG. 11 are the same as the components of the ink container 30 in FIG. 8 except a support 380B provided in an ink chamber 340B, and thus, a repeated description of common portions is omitted.

The support 380B in FIG. 11 includes a first support 382B and a third support 386B, and the first support 382B and the third support 386B correspond to the first support 382 and the third support 386 in FIG. 8, respectively. The first support 382B has a triangle column shape extending in the Y-axis direction. The third support 386B is the same as the third support 386A in FIG. 10. In this manner, the upper surface of the support 380B in FIG. 11 has an upward convex shape in the vertical direction and the support does not have a horizontal upper surface, and thus, the generation of aggregates can be effectively suppressed.

As shown in FIGS. 10 and 11, plural first supports 382A (382B) may be provided from the viewpoint of improving the adhesion of the first side surface 372A. In this case, as shown in FIG. 10, when the ink container 30A is viewed from the side by setting the first side surface 372A in the use state as a front, a distance D1 between one support and another adjacent support among the first supports 382A is preferably 25% or less of a distance (length) D of the ink container 30 in the longitudinal direction. Accordingly, the adhesion strength of the first side surface 372A (film) may be further improved. The distance D1 refers to a distance of the shortest straight line among straight lines connecting the surface of one support and the surfaces of other adjacent supports.

As shown in FIG. 10, when the ink container 30A is viewed from the side by setting the first side surface 372A in the use state as a front, a distance D2 between the first support 382A and the side surface 372 of the wall 370 is preferably 25% or less of the distance (length) D of the ink container 30 in the longitudinal direction. Accordingly, the adhesion strength of the first side surface 372A may be further improved. The distance D2 refers to a distance of the shortest straight line among straight lines connecting the surfaces of the first supports 382A and the surface of the side surface 372.

The support 380 may have a cutout or a hole from the viewpoint of improving circularity of ink in the ink chamber 340.

The shape of the ink chamber 340 is an approximately columnar shape extending in the vertical direction in the use state in the examples of FIGS. 6 and 7, but the shape is not limited thereto.

Here, after the initial ink filling (for example, ink filling up to 90% of the volume of the ink chamber at the time of shipping of the ink container or the like), the gas-liquid interface of the ink is in contact with a specific portion of the wall partitioning the ink chamber for a long period of time in some cases. In this case, aggregates caused by the ink on the wall with which the gas-liquid interface of the ink is in contact may be easily generated. The generation of aggregates can be suppressed by using an ink chamber having a region in which the gas-liquid interface of the ink increases when the amount of the ink with which the ink chamber is filled is reduced. A specific example of the ink container having such a shape is shown in FIG. 12.

Figure 12:
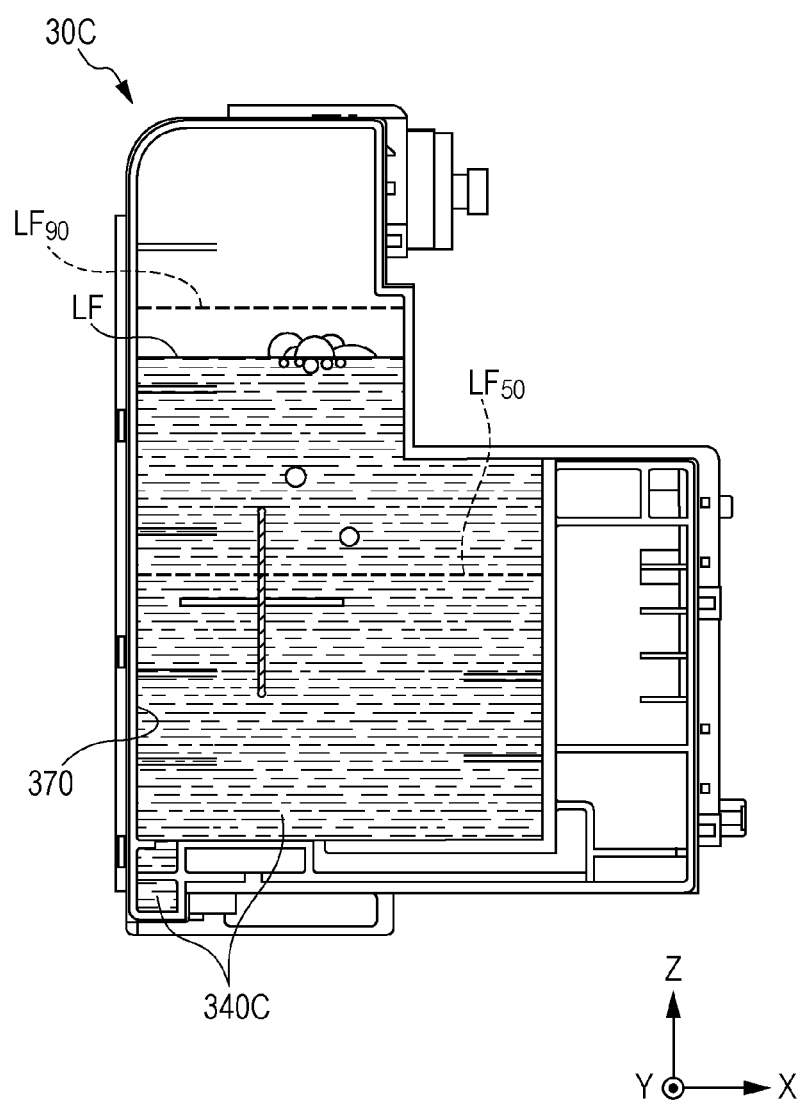
FIG. 12 is a side view schematically showing the shape of an ink container according to an embodiment of the invention.

FIG. 12 is a side view schematically showing an example of the shape of an ink container. FIG. 12 is a view when an ink container 30C is viewed from the minus direction of the Y-axis, and the components of the ink container 30C are the same as the components of the ink container 30 in FIG. 8 except that the shape of an ink chamber 340C is different, and thus, a repeated description of common portions is omitted.

$LF_{90}$ in FIG. 12 refers to a position of the liquid surface LF of the ink when the ink chamber 340C is filled with the ink up to 90% of the volume. $LF_{50}$ in FIG. 12 refers to a position of the liquid surface of the ink when the ink in the ink chamber 340C is consumed up to 50% of the volume. In FIG. 12, the area of the liquid surface LF of the ink when the liquid surface reaches the height of $LF_{90}$ is smaller than the area of the liquid surface LF of the ink when the liquid surface reaches the height of $LF_{50}$. Then, the number of contact portions between the gas-liquid interface of the ink (liquid surface LF of the ink) and the wall 370 at the time of initial filling decreases, and thus, the generation of aggregates can be suppressed.

In the ink chamber 340, it is preferable that an ink absorber (for example, a urethane foam or a fiber structure) which absorbs or holds ink not be provided. Since there is concern of the ink absorber increasing the area of the gas-liquid interface between the ink and the external air and easily holding aggregates generated in the ink chamber 340, the smooth circulation of the ink is hindered, which causes inconveniences such as ink supply failure in some cases.

5. First Example

Hereinafter, the present invention will be further described in detail with reference to Examples and Comparative Examples. However, the invention is not limited to the following Examples.

5.1. Preparation of Ink Composition

After each component having a blending amount shown in Table 1 was mixed and stirred, the mixture was pressurized and filtered using a membrane filter having a pore size of 10 μm to obtain inks 1 to 3. The unit in Table 1 is % by mass. The contents of the resin and the pigment are values in terms of solid content.

Among the components used in Table 1, the components indicated by the abbreviated name or the product name are as follows.

Carbon Black (C.I. Pigment Black 7, volume-based average particle size: 100 nm, self-dispersion pigment)

Styrene acrylic resin (fixing resin, glass transition temperature Tg: −15° C., volume-based average particle size: 80 nm, emulsion of styrene-acrylic ester copolymer)

BYK-348 (product name, manufactured by BYK, silicone surfactant)

The surface tension of the obtained inks 1 to 3 was measured. The surface tension is a value obtained by measuring the surface tension when a platinum plate was wetted with the ink in a 20° C. environment using an automatic surface tension meter CBVP-Z (manufactured by Kyowa Interface Science Co., LTD.). The value of the surface tension of each ink is shown together in Table 1.

TABLE 1

|  |  | Ink 1 | Ink 2 | Ink 3 |
|---|---|---|---|---|
| Pigment | Carbon black | 3 | 3 | 3 |
| Resin | Styrene acrylic resin | 1 |  | 1 |
| Organic solvent | 1,2-Hexanediol | 3 | 3 | 3 |
|  | Glycerin | 5 | 5 | 5 |
| Surfactant | BYK348 | 0.5 | 0.5 |  |
| Water | Pure water | Balance | Balance | Balance |
|  | Total (% by mass) | 100 | 100 | 100 |
|  | Surface tension (mN/m) | 26 | 26 | 36 |

5.2. Production of Ink Container

Ink containers 1 to 5 having the same shape as in FIG. 7 were produced by known methods using materials in Table 2. In the ink containers 1, 3 and 4, the material of each ink container is the same as the material of the inner member of the wall partitioning the ink chamber. On the other hand, in each of the ink containers 2 and 5, the material of the inner member of the wall partitioning the ink chamber is silicone resin and a methyl silicate oligomer. Specifically, each ink container was formed of polypropylene, and then, silicone resin and a methyl silicate oligomer were applied to the inner side of the wall partitioning the ink chamber to obtain the ink containers 2 and 5.

The detail of the materials used in the Table 2 is as follows.

PFA (tetrafluoroethylene-perfluoroalkyl vinyl ether copolymer)

PP (polypropylene)

PET (polyethylene terephthalate)

Silicone resin (product name: HC 303 VP, manufactured by WACKER ASAHIKASEI SILICONE CO., LTD.)

Methyl silicate oligomer (hydrophilic material)

TABLE 2

|  | Ink container 1 | Ink container 2 | Ink container 3 | Ink container 4 | Ink container 5 |
|---|---|---|---|---|---|
| Material of ink container | PFA | PP | PET | PP | PP |
| Material of member constituting inner side of wall of ink chamber | PFA | Silicone resin | PET | PP | Methyl silicate oligomer |

5.3. Evaluation Test
5.3.1. Liquid Repellency
Static Contact Angle CA ($CA_0$) Before Moisture Evaporation A static contact angle CA ($CA_0$) between the member constituting the inner side of the wall partitioning the ink chamber and the ink before moisture evaporation was measured as follows.

First, a plate-like sample was obtained from each of the ink containers 1 to 5 by cutting out the member constituting the inner side of the wall partitioning the ink chamber. Then, the static contact angle CA ($CA_0$) was measured according to a sessile drop method of JIS R 3257 (Test Method for Surface Wettability of Glass Substrate) except that a glass substrate was changed to the plate-like sample and pure water was changed to ink.

The static contact angle was measured by a sessile drop method using an automatic contact angle measuring apparatus OCAH 200 (product name, manufactured by Data Physics Corporation) as a measuring apparatus. The static contact angle was a value (average value of five points) obtained by dropping 1 μl of ink droplets on the sample and measuring a contact angle after one minute elapsed from the dropping of the ink droplets.

Static Contact Angle $CA_1$ after Moisture Evaporation

1% of moisture in the ink evaporated and then, a static contact angle $CA_1$ after moisture evaporation was measured as in the aforementioned "Static Contact Angle CA ($CA_0$) Before Moisture Evaporation".

5.3.2. Clogging of Filter

Each of the ink containers 1 to 5 thus obtained was mounted on an ink jet printer having the same configuration as in FIG. 1A. Next, the ink chamber was filled with 500 ml of an ink 1, the ink container was set to have a posture in a use state, and then, was left for two weeks under the condition of a temperature of 40° C. and a relative humidity of 20% RH.

After two weeks, 500 ml of ink in the ink chamber was discharged from the recording head, and the clogging state of the filter (material: SUS, mesh pore size: 3.5 μm) provided in the ink supply tube which connects the ink container and the subtank was checked. The clogging state of the filter was evaluated by checking the surface of the filter using a digital microscope VHX-900 (manufactured by KEYENCE CORPORATION) and calculating the area (%) of the clogging with respect to the area of the filter. Since the amount of liquid passing was 3% of life expectancy usage of the ink jet printer, the amount of clogging was multiplied by 30 times to calculate the area of the clogging.

Evaluation criteria are as follows.
S: The area of the clogging of the filter was 10% or less.
A: The area of the clogging of the filter was more than 10% and 20% or less.
B: The area of the clogging of the filter was more than 20% and 40% or less.
C: The area of the clogging of the filter was more than 40% and 50% or less.
D: The area of the clogging of the filter was more than 50%.

5.4 Evaluation Results

The results of the evaluation test are shown in Table 3.

TABLE 3

| | | Example 1 | Example 2 | Example 3 | Example 4 | Comparative Example 1 |
|---|---|---|---|---|---|---|
| Ink container used | | Ink container 1 | Ink container 2 | Ink container 3 | Ink container 4 | Ink container 5 |
| Ink used | | Ink 1 | Ink 1 | Ink 1 | Ink 1 | Ink 1 |
| Evaluation result | Static contact angle CA ($CA_0$) | 36° | 27° | 18° | 25° | Less than 10°, unmeasurable due to overwetting |
| | Static contact angle $CA_1$ after moisture evaporation | 33° | 25° | 15° | 14° | — |
| | Decrease in contact angle ($CA_0 - CA_1$) | 3° | 2° | 3° | 11° | — |
| | Clogging of filter | S | A | B | C | D |

As seen from the evaluation results shown in Table 3, it was found that when the static contact angle CA ($CA_0$) between the member constituting the inner side of the wall partitioning the ink chamber and the ink 1 before moisture evaporation was 10° or more, the clogging of the filter was reduced (refer to Examples 1 to 4). In this manner, it was found that when the combination of the ink and the member between which the static contact angle CA ($CA_0$) is 10° or more was used, the generation of aggregates was able to be reduced.

In addition, it was found that when $10° \leq CA_0$ and $10° \leq CA_1$ (the aforementioned condition (1)) was satisfied, and $0° \leq CA_0 - CA_1 \leq 5°$ (the aforementioned condition (2)) was satisfied, the clogging of the filter was further reduced (refer to Examples 1 to 3). Particularly, it was found that when $20° \leq CA_0$ and $20° \leq CA_1$ (the aforementioned condition (1-1)) was satisfied, and $0° \leq CA_0 - CA_1 \leq 5°$ (the aforementioned condition (2)) was satisfied, the clogging of the filter was further reduced (refer to Examples 1 and 2).

On the other hand, as seen from the evaluation results shown in Table 3, in Comparative Example 1, the wettability between the member constituting the inner side of the wall partitioning the ink chamber and the ink 1 before moisture evaporation was increased excessively, and thus, the static contact angle CA ($CA_0$) was not able to be measured. In addition, the clogging of the filter was severe and the discharge stability of the recording head was impaired.

A decrease in the contact angle ($CA_0 - CA_1$) was obtained in the same manner as in the aforementioned Examples 1 except that an ink 2 was used. As a result, the value of the decrease in the contact angle ($CA_0 - CA_1$) obtained by the use of the ink 2 was lower (that is, less than 3°) than the value of the decrease in the contact angle ($CA_0 - CA_1$) in Example 1. Further, when the evaluation test of the clogging of the filter was conducted by the use of the ink 2, the clogging of the filter was reduced compared to Example 1. It is considered that since the solid content of the ink 2 was lower than the solid content of the ink 1, and the ink 2 did not contain resin, pigment aggregation caused by resin did not occur.

The clogging of the filter was evaluated in the same manner as in the aforementioned Example 1 except that an ink 3 was used. As a result, it was found that when the ink 3 was used, the clogging of the filter did not easily occur compared to a case in which the ink 1 was used. It is considered that since the surface tension of the ink 3 was higher than the surface tension of other inks, the ink was not easily attached to the wall surface of the ink chamber and aggregates were not easily generated.

6. Second Example

After each component having a blending amount shown in Table 4 was mixed and stirred, the mixture was pressurized and filtered using a membrane filter having a pore size of 10 μm to obtain inks A (seven types of compositions with different types of solvents) and B. The unit in Table 4 is % by mass. The contents of the resin and the pigment are values in terms of solid content.

Among the components used in Table 4, the components indicated by the abbreviated name or the product name are as follows.
    Carbon Black (C.I. Pigment Black 7, volume-based average particle size: 100 nm, self-dispersion pigment)
    Styrene acrylic resin (fixing resin, Tg: −15° C., volume-based average particle size: 80 nm, emulsion of styrene-acrylic ester copolymer)

As a solvent A, solvents in Table 5 were added to form ink compositions of Examples 1 to 7. The solvent of the ink composition of Example 7 was 13% by mass of glycerin.

TABLE 4

|  |  | Ink A | Ink B |
|---|---|---|---|
| Pigment | Carbon black | 3 | 3 |
| Resin | Styrene acrylic resin | 1 | 1 |
| Organic solvent | 1,2-Hexanediol | 3 |  |
|  | Glycerin | 10 | 13 |
|  | Solvent A | 3 |  |
| Surfactant | BYK348 | 0.5 | 0.5 |
| Water | Pure water | Balance | Balance |
|  | Total (% by mass) | 100 | 100 |

6.1. Measurement of Surface Tension

The surface tension of the obtained ink composition of each Example was measured before a solvent evaporation test was conducted. Then, the ink composition was left for 0.75 hours under the condition of 60° C. to allow 3.5% by mass of the solvent in the ink to evaporate. In the same manner, the ink composition was left for 1.5 hours to allow 7% by mass of the solvent in the ink to evaporate, and the ink composition was left for 2.5 hours to allow 12% by mass of the solvent in the ink to evaporate. The surface tension is a value obtained by measuring the surface tension when a platinum plate is wetted with the ink in a 20° C. environment using an automatic surface tension meter CBVP-Z (manufactured by Kyowa Interface Science Co., LTD.). The surface tension of each ink and the surface tension variation of each ink are shown together in Table 5. The surface tension variation is obtained by calculating a variation based on the initial surface tension.

6.2. Evaluation Test of Precipitates

The ink chamber of the ink container 30 was filled with 500 ml of the ink composition in each of Examples 1 to 8, and the ink container was set to have a posture in a use state. Then, the ink container was left for two weeks under the condition of a temperature of 40° C. and a relative humidity of 20% RH. After two weeks, 500 ml of the ink in the ink chamber was discharged from the recording head, and the clogging state of the filter (material: SUS, mesh pore size: 3.5 μm) provided in the ink supply tube which connects the ink container and the subtank was checked. The clogging state of the filter was evaluated by checking the surface of the filter using a digital microscope VHX-900 (manufactured by KEYENCE CORPORATION).

Based on the result obtained by observing the surface, ranking of the amount of precipitates generated was conducted in ascending order among the ink composition group of each Example, and the results were shown in Table 5. In Table 5, an ink having a small number in the evaluation of precipitates is an ink in which the smallest amount of precipitates is generated, and an ink having a large number is an ink in which the largest amount of precipitates is generated.

As seen from the results in Table 5, it was observed that in a case in which only glycerin was used as a moisturizer (Example 7), there was a strong tendency that the surface tension when the solvent evaporated was lowered, and the amount of precipitates was large. In addition, an ink whose

TABLE 5

|  |  |  |  | Initial surface tension (mN/m) | Change after 3.5% evaporation | Change after 7% evaporation | Change after 12% evaporation | Precipitate evaluation |
|---|---|---|---|---|---|---|---|---|
| Ink A | Name of solvent A | Diethylene glycol | Example 1 | 26.14 | 0.36 | 0.07 | 0.03 | 2 |
|  |  | Dipropylene glycol | Example 2 | 26.2 | 0.37 | 0.05 | 0.01 | 3 |
|  |  | 1,3-Butanediol | Example 3 | 26.16 | 0.51 | 0.17 | 0.11 | 4 |
|  |  | Propylene glycol | Example 4 | 26.34 | 0.27 | 0.17 | 0.14 | 5 |
|  |  | Triethylene glycol | Example 5 | 26.22 | 0.33 | 0.04 | −0.07 | 6 |
|  |  | 2-Pyrrolidone | Example 6 | 26.21 | 0.33 | −0.2 | −0.1 | 7 |
|  |  | Glycerin | Example 7 | 26.74 | −0.22 | 0 | −0.14 | 8 |
| Ink B |  |  | Example 8 | 26.4 | 0.79 | 0.4 | 0.35 | 1 | the surface tension when the solvent evaporated was likely to be increased had a tendency that a lesser amount of precipitates was generated. As seen from the result of Example 8, it was found that a solvent, such as 1,2-hexanediol, exerting high wettability (permeability) had a tendency that the surface tension was lowered in the long term, and caused precipitates to be generated.

The invention is not limited to the above-described embodiments and further, various modifications can be made. For example, the invention includes substantially the same configuration (for example, a configuration which has the same function, method, and results or a configuration which has the same object and effect) as the configuration described in the embodiments. Further, the invention includes a configuration which replaces a non-essential section of the configuration described in the embodiments. Further, the invention includes a configuration which has the same operation advantage as the configuration described in the embodiments or a configuration which can accomplish the same object. Further, the invention includes a configuration in which a well-known technology is added to the configuration described in the embodiments.

The entire disclosures of Japanese Patent Application Nos. 2013-169430, filed on Aug. 19, 2013; 2013-169713 filed on Aug. 19, 2013; 2013-169714 filed on Aug. 19, 2013; 2014-068093, filed on Mar. 28, 2014; 2014-124191 filed on Jun. 17, 2014; and 2014-124257 filed on Jun. 17, 2014 are expressly incorporated by reference herein.

What is claimed is:

1. An ink composition adapted to be poured into an ink container including a first ink chamber and a second ink chamber, the first and second ink chambers being partitioned by a wall, the first ink chamber having a greater volume than the second ink chamber, and the ink container refillable with the ink composition via an ink pouring port, and always communicating with external air via an air introduction portion that is formed in the first ink chamber and is located downstream from an air chamber that always communicates with the external air, the ink composition comprising:
a pigment;
a resin; and
an organic solvent,
wherein the ink composition has a static contact angle of 10° or more to a member constituting an inner side of the wall.

2. The ink composition according to claim 1, further comprising water,
wherein the ink composition satisfies following conditions (1) and (2), $$10° \leq CA_0, \text{ and } 10° \leq CA_1 \qquad \text{Condition (1):}$$

$$0° \leq CA_0 - CA_1 \leq 5° \qquad \text{Condition (2):}$$

where
$CA_0$ is a static contact angle between the ink composition before moisture evaporation and the member constituting the inner side of the wall, and
$CA_1$ is a static contact angle between the ink composition when 1% by mass of moisture with respect to a total mass (100% by mass) of the ink composition before moisture evaporation evaporates and the member constituting the inner side of the wall.

3. The ink composition according to claim 1,
wherein the ink composition has a surface tension of 20 mN/m or more and 50 mN/m or less.

4. The ink composition according to claim 1,
wherein the content of the organic solvent is 5% by mass or more and 40% by mass or less.

5. The ink composition according to claim 1,
wherein the organic solvent includes
glycerin, and
at least one selected from the group consisting of polyhydric alcohols excluding the glycerin, nitrogen-containing heterocyclic compounds, urea, and urea derivatives.

6. The ink composition according to claim 1,
wherein the glass transition temperature of the resin is 25° C. or lower.

7. The ink composition according to claim 1,
wherein the ink composition has a receding contact angle of 5° or more to the member constituting the inner side of the wall.

8. The ink composition according to claim 1,
wherein the ink composition satisfies two or more of the following conditions (3-1), (3-2), and (3-3), or all the following conditions (4-1) to (4-3), $$\gamma_{M1} - \gamma_{M0} > 0 (mN/m) \qquad \text{Condition (3-1):}$$

$$\gamma_{M2} - \gamma_{M0} > 0 (mN/m) \qquad \text{Condition (3-2):}$$

$$\gamma_{M3} - \gamma_{M0} > 0 (mN/m) \qquad \text{Condition (3-3):}$$

$$\gamma_{M1} - \gamma_{M0} > -0.05 (mN/m) \qquad \text{Condition (4-1):}$$

$$\gamma_{M2} - \gamma_{M0} > -0.05 (mN/m) \qquad \text{Condition (4-2):}$$

$$\gamma_{M3} - \gamma_{M0} > -0.05 (mN/m) \qquad \text{Condition (4-3):}$$

where
$\gamma_{M0}$ is an initial surface tension of the ink composition,
$\gamma_{M1}$ is a surface tension when 3.5% by mass of the solvent in the ink evaporates,
$\gamma_{M2}$ is a surface tension when 7% by mass of the solvent in the ink evaporates, and
$\gamma_{M3}$ is a surface tension when 12% by mass of the solvent in the ink evaporates.

9. The ink composition according to claim 1,
wherein the content of the organic solvent is more than one time and 10 times or less of a total of the content of the pigment and the content of the resin.

10. A set comprising:
the ink composition according to claim 1; and
the ink container.

11. A recording apparatus comprising:
the ink container according to claim 1.

12. The ink composition according to claim 1, wherein the second chamber is located downstream from the first chamber.

* * * * *